(12) United States Patent
Liu et al.

(10) Patent No.: US 12,726,294 B2
(45) Date of Patent: Sep. 1, 2026

(54) METHOD AND DEVICE FOR DETERMINING A HARQ-ACK POSITION

(71) Applicant: Apogee 5G Global, LLC, Plano, TX (US)

(72) Inventors: Zheng Liu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 340 days.

(21) Appl. No.: 18/223,039

(22) Filed: Jul. 18, 2023

(65) Prior Publication Data

US 2024/0031069 A1 Jan. 25, 2024

(30) Foreign Application Priority Data

Jul. 19, 2022 (CN) ......................... 202210849339.3

(51) Int. Cl.
*H04L 1/1812* (2023.01)
*H04W 72/1273* (2023.01)
*H04W 72/23* (2023.01)

(52) U.S. Cl.
CPC ....... *H04L 1/1812* (2013.01); *H04W 72/1273* (2013.01); *H04W 72/23* (2023.01)

(58) Field of Classification Search
CPC ... H04L 1/1812; H04L 1/1854; H04L 1/1861; H04L 1/1896; H04W 72/1273
See application file for complete search history.

(56) References Cited

U.S. PATENT DOCUMENTS 12,342,340 B2 6/2025 Liu et al.
12,500,698 B2 12/2025 Gao
12,501,448 B2 12/2025 Gao
(Continued)

FOREIGN PATENT DOCUMENTS

CN 113285788 A 8/2021
CN 113473635 A * 10/2021 ............ H04W 72/20
WO 2021164729 A1 8/2021

OTHER PUBLICATIONS

Third Generation Partnership Project, "Technical Specification Group Radio Access Network; NR; Multiplexing and channel coding (Release 17)," 3GPP TS 38.212 V17.2.0 (Jun. 2022).
(Continued)

*Primary Examiner* — Zhensheng Zhang
(74) *Attorney, Agent, or Firm* — Volpe Koenig

(57) ABSTRACT

The application provides a method and device in a node for wireless communications. A node receives a first information block and receives a first signaling, the first signaling corresponds to a first cell set, the first information block is used to determine the first cell set; a node transmits a first signal in a target slot, the first signal carries a first HARQ bit block, the first HARQ bit block comprises a target HARQ-ACK bit, a detection on the first signaling is used to determine a bit value of the target HARQ-ACK bit; time-domain resources occupied by the first signaling are used to determine a reference slot; the first signaling is used to determine a number of slot(s) between the reference slot and the target slot; a reference serving cell is a serving cell related to the first cell set. The present application ensures a transmission of HARQ-ACK bits.

20 Claims, 4 Drawing Sheets

(56) References Cited

U.S. PATENT DOCUMENTS

2020/0337030 A1* 10/2020 Zhang .................. H04L 1/1896

OTHER PUBLICATIONS

Third Generation Partnership Project, "Technical Specification Group Radio Access Network; NR; Physical layer procedures for control (Release 17)," 3GPP TS 38.213 V17.2.0 (Jun. 2022).

Third Generation Partnership Project, "Technical Specification Group Radio Access Network; NR; Physical layer procedures for data (Release 17)," 3GPP TS 38.214 V17.2.0 (Jun. 2022).

Third Generation Partnership Project, "Technical Specification Group Radio Access Network; NR; Radio Resource Control (RRC) protocol specification (Release 17)," 3GPP TS 38.331 V17.0.0 (Mar. 2022).

Third Generation Partnership Project, "Technical Specification Group Radio Access Network; NR; Physical channels and modulation (Release 17)," 3GPP TS 38.211 V17.2.0 (Jun. 2022).

Nokia Siemens Networks, "Response to R1-130505/0506; Multiflow HS-DPCCH timing in the non-time reference cell," 3GPP TSG RAN WG1 Meeting #72, R1-130720, St. Julian's, Malta (Jan. 28-Feb. 1, 2013).

* cited by examiner

| Row index | Slot offset | Mapping type | Start and Length indicator value（SLIV） |
|---|---|---|---|
| 1 | $a_1$ | A | $b_1$ |
| 2 | $a_2$ | B | $b_2$ |
| 3 | $a_3$ | B | $b_3$ |
| 4 | $a_4$ | A | $b_4$ |
| 5 | $a_5$ | B | $b_5$ |
| 6 | $a_6$ | A | $b_6$ |
| 7 | $a_7$ | A | $b_7$ |
| 8 | $a_8$ | A | $b_8$ |
FIG. 10
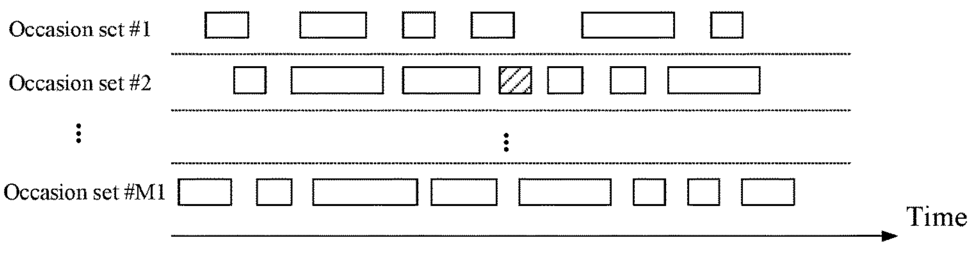
FIG. 11
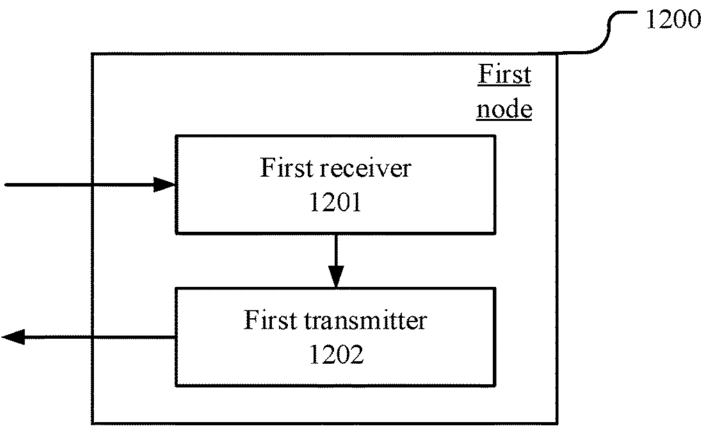
FIG. 12
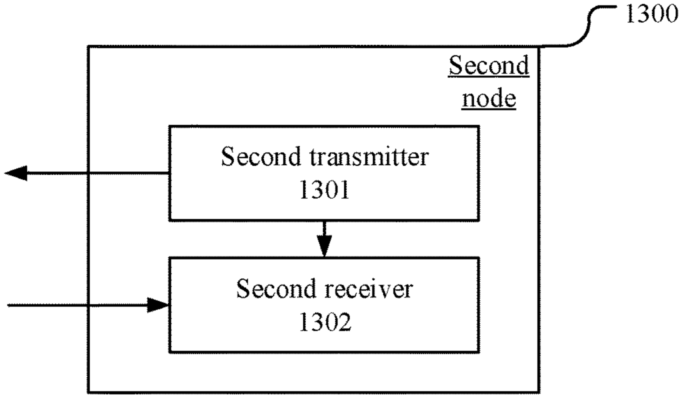
FIG. 13

METHOD AND DEVICE FOR DETERMINING A HARQ-ACK POSITION

CROSS REFERENCE TO RELATED APPLICATIONS

This application claims the priority benefit of Chinese Patent Application No. 202210849339.3, filed on Jul. 19, 2022, the full disclosure of which is incorporated herein by reference.

BACKGROUND

Technical Field

The present application relates to transmission methods and devices in wireless communication systems, and in particular to a transmission method and device of multicarrier symbol in wireless communications.

Related Art

Application scenarios of future wireless communication systems are becoming increasingly diversified, and different application scenarios have different performance demands on systems. In order to meet different performance requirements of various application scenarios, it was decided at 3rd Generation Partner Project (3GPP) Radio Access Network (RAN) #72th plenary that a study on New Radio (NR), or what is called Fifth Generation (5G) shall be conducted. The work item of NR was approved at 3GPP RAN #75th plenary to standardize NR.

In New Radio (NR) technology, multicarrier (including carrier aggregation and dual connectivity) technology is an important component. In order to adapt to diverse application scenarios and meet different needs, 3GPP has been evolving multi-carrier technology since the Rel-15 version.

SUMMARY

In the process of multicarrier communications, such as Carrier Aggregation (CA), cross-carrier scheduling is supported. In networks supported by the existing standard, such as R17 and 5G NR of previous versions, for multiple scheduled carriers, scheduling is only supported on a corresponding carrier or a corresponding Physical Downlink Control Channel (PDCCH) instead of on a same PDCCH on a same carrier. When a same PDCCH scheduling PDSCHs or PUSCHs on multiple carriers at the same time is supported in a multicarrier system, the feedback of Hybrid Automatic Repeat Request Recognition (HARQ-ACK) needs to be enhanced.

The present application discloses a solution to the problem of HARQ-ACK enhancement design in the multi-carrier system of NR. It should be noted that though the present application only took PDCCH scheduling in multi-carrier for example in the statement above; the present application is also applicable to other scenarios facing similar problems (such as other scenarios with higher requirements for controlling channel capacity, including but not limited to capacity enhancement systems, systems using higher frequency, coverage enhancement systems, unlicensed frequency-domain communications, Internet of Things (IoT), Ultra Reliable Low Latency Communication (URLLC) networks and Vehicle-to-everything, etc.), where similar technical effects can also be achieved. Additionally, the adoption of a unified solution for various scenarios, including but not limited to scenarios of multicarrier, contributes to the reduction of hardware complexity and costs. If no conflict is incurred, embodiments in a first node in the present application and the characteristics of the embodiments are also applicable to a second node, and vice versa. Particularly, for interpretations of the terminology, nouns, functions and variants (if not specified) in the present application, refer to definitions given in TS36 series, TS38 series and TS37 series of 3GPP specifications.

The present application provides a method in a first node for wireless communications, comprising:

receiving a first information block and receiving a first signaling, the first signaling corresponding to a first cell set, and the first cell set comprising multiple serving cells, the first information block being used to determine the first cell set; and transmitting a first signal in a target slot, the first signal carrying a first HARQ bit block, the first HARQ bit block comprising multiple HARQ-ACK bits, the first HARQ bit block comprising a target HARQ-ACK bit, a detection on the first signaling being used to determine a bit value of the target HARQ-ACK bit;

herein, time-domain resources occupied by the first signaling are used to determine a reference slot; the first signaling is used to determine a number of slot(s) between the reference slot and the target slot, and a time length of the reference slot is related to a Subcarrier Spacing (SCS) of a subcarrier occupied by the first signal; a reference serving cell is a serving cell related to the first cell set, and a position of the target HARQ-ACK bit in the first HARQ bit block is related to the reference serving cell.

In one embodiment, by introducing a reference serving cell, the problem of ambiguous position of a HARQ-ACK bit of a PDCCH without scheduling a PDSCH for multiple serving cells is solved, which ensures the correct reception of a HARQ-ACK bit.

According to one aspect of the present application, the above method is characterized in that the reference serving cell is a predefined serving cell comprised in the first cell set, and the first signaling carries a DCI format, a DCI format carried by the first signaling comprises information other than PDSCH scheduling information; a position of the target HARQ-ACK bit in the first HARQ bit block is the same as a position of a HARQ-ACK bit of a PDSCH belonging to the reference serving cell and corresponding to the first signaling in the first HARQ bit block.

In one embodiment, a position of a target HARQ-ACK bit in a first HARQ bit block is the same as a position of a HAR-ACK bit of a PDSCH of a reference serving cell in the first HARQ bit block, which enables a consistent understanding of a position of a HARQ-ACK bit of a PDCCH without scheduling a PDSCH on the network side and user device side, while reducing the burden of standardization.

According to one aspect of the present application, a characteristic of the above method is that a first delay value is equal to a number of slot(s) between the reference slot and the target slot, and the first delay value is an integer; the first delay value is a delay value comprised in a target delay set, the target delay set comprises at least one delay value, and any delay value comprised in the target delay set is an integer; a DCI format carried by the first signaling is used to determine the target delay set.

In one embodiment, a target delay set is determined through a DCI format carried by a first signaling, which ensures the delay requirement of a HARQ-ACK feedback of a PDCCH without scheduling a PDCCH for multiple serving cells and improves the scheduling flexibility.

According to one aspect of the present application, the above method is characterized in that the first signal is later than the first signaling in time domain, and a number of time-domain symbol(s) between the first signal and the first signaling in time domain is not less than a first threshold, and the first threshold is greater than 0; a first index value is equal to an index value of an SCS of a subcarrier occupied by the first signaling in frequency domain, a second index value is equal to an index value of an SCS of a subcarrier occupied by the first signal in frequency domain, and a smaller one of the first index value and the second index value is used to determine the first threshold.

According to one aspect of the present application, the method is characterized in that the first signaling carries a first DCI format, and a first field is a field comprised in the first DCI format, and the first field comprised in the first signaling is set to a predefined value; a size of the first DCI format is related to a number of serving cells comprised in the first cell set; a position of the first field in the first DCI format is used to determine a first serving cell from the first cell set, and the first DCI format is used for the first serving cell.

In one embodiment, a first serving cell is determined according to a position of a field with a predefined value in a first DCI format, which implements an implicit dynamic adjustment of a PDCCH without scheduling a PDSCH on the serving cell, thus improving the flexibility and reducing the header overhead at the same time.

According to one aspect of the present application, the characteristic of the above method is in that a serving cell to which the first signaling belongs and a time-domain occasion occupied by the first signaling in a serving cell to which it belongs are used to determine a position of the target HARQ-ACK bit in the first HARQ bit block, and a row index in a time-domain resource assignment table belonging to the reference serving cell is used to determine a time-domain occasion occupied by the first signaling in a serving cell to which it belongs.

According to one aspect of the present application, the characteristic of the above method is in that time-domain resources occupied by the first signaling belong to a first time-domain occasion, the first time-domain occasion is a time-domain occasion comprised in a first occasion set, the first occasion set is one of M1 occasion sets, and any of the M1 occasion sets comprise at least one time-domain occasion, M1 being a positive integer greater than 1; the M1 occasion sets respectively correspond to M1 serving cells, a serving cell to which the first signaling belongs is one of the M1 serving cells, the first occasion set is an occasion set corresponding to a serving cell to which the first signaling belongs; the M1 serving cells are indexed in order, and time-domain occasions comprised in the first occasion set are indexed in order; HARQ-ACK bits comprised in the first HARQ bit block are indexed in order, any time-domain occasion comprised in any of the M1 occasion sets corresponds to at least one HARQ-ACK bit in the first HARQ bit block, the target HARQ-ACK bit is a HARQ-ACK bit corresponding to the first time-domain occasion in the first HARQ bit block, and an index of the target HARQ-ACK bit in the first HARQ bit block is related to both an index of a serving cell corresponding to the first occasion set and an index of the first time-domain occasion in the first occasion set.

The present application provides a method in a second node for wireless communications, comprising:

transmitting a first information block and transmitting a first signaling, the first signaling corresponding to a first cell set, and the first cell set comprising multiple serving cells, the first information block being used to determine the first cell set; and receiving a first signal in a target slot, the first signal carrying a first HARQ bit block, the first HARQ bit block comprising multiple HARQ-ACK bits, the first HARQ bit block comprising a target HARQ-ACK bit, a detection on the first signaling being used to determine a bit value of the target HARQ-ACK bit;

herein, time-domain resources occupied by the first signaling are used to determine a reference slot; the first signaling is used to determine a number of slot(s) between the reference slot and the target slot, and a time length of the reference slot is related to an SCS of a subcarrier occupied by the first signal; a reference serving cell is a serving cell related to the first cell set, and a position of the target HARQ-ACK bit in the first HARQ bit block is related to the reference serving cell.

According to one aspect of the present application, the above method is characterized in that the reference serving cell is a predefined serving cell comprised in the first cell set, and the first signaling carries a DCI format, a DCI format carried by the first signaling comprises information other than PDSCH scheduling information; a position of the target HARQ-ACK bit in the first HARQ bit block is the same as a position of a HARQ-ACK bit of a PDSCH belonging to the reference serving cell and corresponding to the first signaling in the first HARQ bit block.

According to one aspect of the present application, a characteristic of the above method is that a first delay value is equal to a number of slot(s) between the reference slot and the target slot, and the first delay value is an integer; the first delay value is a delay value comprised in a target delay set, the target delay set comprises at least one delay value, and any delay value comprised in the target delay set is an integer; a DCI format carried by the first signaling is used to determine the target delay set.

According to one aspect of the present application, the above method is characterized in that the first signal is later than the first signaling in time domain, and a number of time-domain symbol(s) between the first signal and the first signaling in time domain is not less than a first threshold, and the first threshold is greater than 0; a first index value is equal to an index value of an SCS of a subcarrier occupied by the first signaling in frequency domain, a second index value is equal to an index value of an SCS of a subcarrier occupied by the first signal in frequency domain, and a smaller one of the first index value and the second index value is used to determine the first threshold.

According to one aspect of the present application, the method is characterized in that the first signaling carries a first DCI format, and a first field is a field comprised in the first DCI format, and the first field comprised in the first signaling is set to a predefined value; a size of the first DCI format is related to a number of serving cells comprised in the first cell set; a position of the first field in the first DCI format is used to determine a first serving cell from the first cell set, and the first DCI format is used for the first serving cell.

According to one aspect of the present application, the characteristic of the above method is in that a serving cell to which the first signaling belongs and a time-domain occasion occupied by the first signaling in a serving cell to which it belongs are used to determine a position of the target HARQ-ACK bit in the first HARQ bit block, and a row index in a time-domain resource assignment table belonging to the reference serving cell is used to determine a time-domain occasion occupied by the first signaling in a serving cell to which it belongs.

According to one aspect of the present application, the characteristic of the above method is in that time-domain resources occupied by the first signaling belong to a first time-domain occasion, the first time-domain occasion is a time-domain occasion comprised in a first occasion set, the first occasion set is one of M1 occasion sets, and any of the M1 occasion sets comprise at least one time-domain occasion, M1 being a positive integer greater than 1; the M1 occasion sets respectively correspond to M1 serving cells, a serving cell to which the first signaling belongs is one of the M1 serving cells, the first occasion set is an occasion set corresponding to a serving cell to which the first signaling belongs; the M1 serving cells are indexed in order, and time-domain occasions comprised in the first occasion set are indexed in order; HARQ-ACK bits comprised in the first HARQ bit block are indexed in order, any time-domain occasion comprised in any of the M1 occasion sets corresponds to at least one HARQ-ACK bit in the first HARQ bit block, the target HARQ-ACK bit is a HARQ-ACK bit corresponding to the first time-domain occasion in the first HARQ bit block, and an index of the target HARQ-ACK bit in the first HARQ bit block is related to both an index of a serving cell corresponding to the first occasion set and an index of the first time-domain occasion in the first occasion set.

The present application provides a first node for wireless communications, comprising:

- a first receiver, receiving a first information block and receiving a first signaling, the first signaling corresponding to a first cell set, and the first cell set comprising multiple serving cells, the first information block being used to determine the first cell set;
- a first transmitter, transmitting a first signal in a target slot, the first signal carrying a first HARQ bit block,
- the first HARQ bit block comprising multiple HARQ-ACK bits, the first HARQ bit block comprising a target HARQ-ACK bit, a detection on the first signaling being used to determine a bit value of the target HARQ-ACK bit;
- herein, time-domain resources occupied by the first signaling are used to determine a reference slot; the first signaling is used to determine a number of slot(s) between the reference slot and the target slot, and a time length of the reference slot is related to an SCS of a subcarrier occupied by the first signal; a reference serving cell is a serving cell related to the first cell set, and a position of the target HARQ-ACK bit in the first HARQ bit block is related to the reference serving cell.

The present application provides a second node for wireless communications, comprising:

- a second transmitter, transmitting a first information block and transmitting a first signaling, the first signaling corresponding to a first cell set, and the first cell set comprising multiple serving cells, the first information block being used to determine the first cell set; and
- a second receiver, receiving a first signal in a target slot, the first signal carrying a first HARQ bit block, the first HARQ bit block comprising multiple HARQ-ACK bits, the first HARQ bit block comprising a target HARQ-ACK bit, a detection on the first signaling being used to determine a bit value of the target HARQ-ACK bit;
- herein, time-domain resources occupied by the first signaling are used to determine a reference slot; the first signaling is used to determine a number of slot(s) between the reference slot and the target slot, and a time length of the reference slot is related to an SCS of a subcarrier occupied by the first signal; a reference serving cell is a serving cell related to the first cell set, and a position of the target HARQ-ACK bit in the first HARQ bit block is related to the reference serving cell.

BRIEF DESCRIPTION OF THE DRAWINGS

Other features, objects and advantages of the present application will become more apparent from the detailed description of non-restrictive embodiments taken in conjunction with the following drawings:

FIG. 10 illustrates a schematic diagram of a row index in a time-domain resource assignment table according to one embodiment of the present application;

FIG. 11 illustrates a schematic diagram of M1 occasion sets according to one embodiment of the present application;

FIG. 12 illustrates a structure block diagram of a processor in a first node according to one embodiment of the present application;

FIG. 13 illustrates a structure block diagram of a processor in second node according to one embodiment of the present application.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
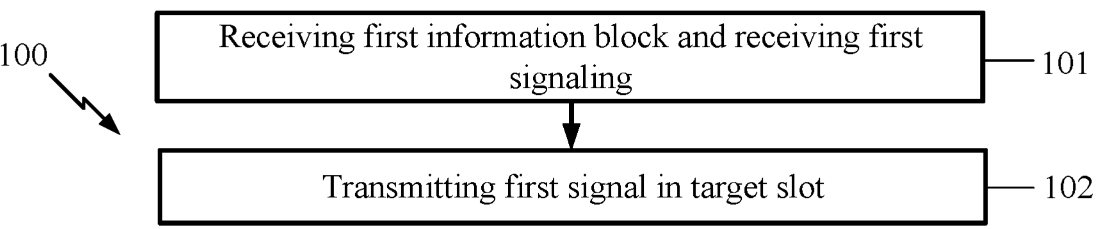
FIG. 1 illustrates a flowchart of a first information block, a first signaling and a first signal according to one embodiment of the present application.

Embodiment 1 illustrates a flowchart 100 of a first information block, a first signaling and a first signal according to one embodiment of the present application, as shown in FIG. 1. In FIG. 1, each box represents a step. Particularly, the sequential order of steps in these boxes is just an example, which does not necessarily mean that the steps are chronologically arranged.

In embodiment 1, the first node in the present application receives a first information block and receives a first signaling in step 101, the first signaling corresponds to a first cell set, and the first cell set comprises multiple serving cells, the first information block is used to determine the first cell set; the first node in the present application transmits a first signal in a target slot in step 102, the first signal carries a first HARQ bit block, the first HARQ bit block comprises multiple HARQ-ACK bits, the first HARQ bit block comprises a target HARQ-ACK bit, a detection on the first signaling is used to determine a bit value of the target HARQ-ACK bit; herein, time-domain resources occupied by the first signaling are used to determine a reference slot; the first signaling is used to determine a number of slot(s) between the reference slot and the target slot, and a time length of the reference slot is related to an SCS of a subcarrier occupied by the first signal; a reference serving cell is a serving cell related to the first cell set, and a position of the target HARQ-ACK bit in the first HARQ bit block is related to the reference serving cell.

In one embodiment, the first information block is transmitted via an air interface or a radio interface.

In one embodiment, the first information block comprises all or part of a higher-layer or a physical-layer signaling.

In one embodiment, the first information block comprises all or part of a Radio Resource Control (RRC)-layer signaling, or the first information block comprises all or part of a Medium Access Control (MAC)-layer signaling.

In one embodiment, the first information block comprises all or part of a System Information Block (SIB).

In one embodiment, the first information block is UE-specific.

In one embodiment, the first information block is per-carrier configured, or the first information block is per-bandwidth part (BWP) configured, or the first information block is per-Physical Uplink Control Channel (PUCCH) group configured.

In one embodiment, the first information block is per-band or per-Frequency Range (FR) configured.

In one embodiment, the first information block comprises all or partial fields in an Information Element (IE) "CellGroupConfig"; or the first information block comprises all or partial fields in an IE "SCellConfig"; or the first information block comprises all or partial fields in an IE "SpCellConfig"; or the first information block comprises all or partial fields in an IE "ServingCellConfig"; or the first information block comprises all or partial fields in an IE "UplinkConfig".

In one embodiment, the first information block comprises a field "secondaryCellGroup", or the first information block comprises a field "masterCellGroup".

In one embodiment, the first information block comprises all or partial fields in an IE "BWP-Downlink", or the first information block comprises all or partial fields in an IE "crossCarrierSchedulingConfig", or the first information block comprises all or partial fields in an IE "PDCCH-ServingCellConfig".

In one embodiment, the first information block comprises all or partial fields in an IE "pdcch-ConfigCommon", or the first information block comprises all or partial fields in an IE "BWP-DownlinkCommon", or the first information block comprises all or partial fields in an IE "BWP-DownlinkDedicated", or the first information block comprises all or partial fields in an IE "pdcch-Config", or the first information block comprises all or partial fields in an IE "SearchSpace", or the first information block comprises all or partial fields in an IE "SearchSpaceExt-v1800", or the first information block comprises all or partial fields in an IE "SearchSpaceExt2-r18".

In one embodiment, the first information block comprises all or partial fields in an IE "BWP-Uplink"; or the first information block comprises all or partial fields in an IE "BWP-UplinkDedicated"; or the first information block comprises all or partial fields in an IE "PUCCH-Config".

In one embodiment, the first information block comprises all or partial fields in a Downlink Control Information (DCI) format.

In one embodiment, the technical feature that "the first information block is used to determine the first cell set" comprises the following meaning: all or part comprised in the first information block is used to explicitly or implicitly indicate the first cell set.

In one embodiment, the technical feature that "the first information block is used to determine the first cell set" comprises the following meaning: the first information block is used by the first node in the present application to determine the first cell set.

In one embodiment, the technical feature that "the first information block is used to determine the first cell set" comprises the following meaning: all or part comprised in the first information block is used to directly or indirectly indicate the first cell set.

In one embodiment, the technical feature that "the first information block is used to determine the first cell set" comprises the following meaning: all or part comprised in the first information block is used to explicitly or implicitly indicate the at least one serving cell comprised in the first cell set.

In one embodiment, the technical feature that "the first information block is used to determine the first cell set" comprises the following meaning: all or part comprised in the first information block is used to explicitly or implicitly indicate an index of the first cell set.

In one embodiment, the technical feature that "the first information block is used to determine the first cell set" comprises the following meaning: the first information block is used to determine multiple cell sets, any of the multiple cell sets comprises at least one serving cell, and the first cell set is one of the multiple cell sets.

In one embodiment, the technical feature that "the first information block is used to determine the first cell set" comprises the following meaning: the first information block is used for a cell set list, a cell set list determined by the first information block comprises multiple cell sets, any cell set comprised in a cell set list determined by the first information block comprises at least one serving cell, and the first cell set is a cell set comprised in a cell set list determined by the first information block.

In one embodiment, the technical feature that "the first information block is used to determine the first cell set" comprises the following meaning: all or part comprised in the first information block is used to explicitly or implicitly indicate a cell set comprising the first cell set.

In one embodiment, the technical feature that "the first information block is used to determine the first cell set" comprises the following meaning: all or part comprised in the first information block is used to explicitly or implicitly indicate configuring a cell set, the first cell set is a subset of the configured cell set, and the configured cell set comprises multiple serving cells.

In one embodiment, the technical feature that "the first information block is used to determine the first cell set" comprises the following meaning: all or part comprised in the first information block is used to explicitly or implicitly add a cell set into a cell set list, and the first cell set is a cell set added by the first information block into a cell set list.

In one embodiment, the technical feature that "the first information block is used to determine the first cell set" comprises the following meaning: all or part comprised in the first information block is used to explicitly or implicitly release a cell set from a cell set list, and the first cell set is a cell set in a cell set list released by the first information block.

In one embodiment, the technical feature that "the first information block is used to determine the first cell set" comprises the following meaning: all or part comprised in the first information block is used to explicitly or implicitly indicate a cell group comprising the first cell set.

In one embodiment, the technical feature that "the first information block is used to determine the first cell set" comprises the following meaning: all or part comprised in the first information block is used to explicitly or implicitly indicate a number of serving cell(s) comprised in the first cell set.

In one embodiment, the technical feature that "the first information block is used to determine the first cell set" comprises the following meaning: all or part comprised in the first information block is used to explicitly or implicitly indicate a value of a carrier indicator field (CIF) of at least one serving cell comprised in the first cell set.

In one embodiment, the technical feature that "the first information block is used to determine the first cell set" comprises the following meaning: all or part comprised in the first information block is used to explicitly or implicitly indicate an upper limit value of a number of serving cell(s) comprised in the first cell set.

In one embodiment, the first signaling is transmitted via an air interface, or the first signaling is transmitted via a radio interface.

In one embodiment, the first signaling is a physical-layer signaling.

In one embodiment, the first signaling is transmitted through a PDCCH.

In one embodiment, the first signaling comprises all or partial fields in a DCI format.

In one embodiment, the first signaling is an RRC-layer signaling or the first signaling is a MAC-layer signaling.

In one embodiment, the first signaling comprises a field "PDSCH-to-HARQ_feedback timing indicator" in MsgB.

In one embodiment, the first signaling comprises a field "PDSCH-to-HARQ_feedback timing indicator" in a DCI format.

In one embodiment, the first signaling is used to configure a Semi-Persistent Scheduling (SPS) PDSCH.

In one embodiment, the first signaling is used for an SPS PDSCH release.

In one embodiment, the first signaling is used for an SPS PDSCH activation.

In one embodiment, the first signaling comprises a DCI format indicating an SPS PDSCH release, or the first signaling comprises a DCI format indicating a Secondary Cell (SCell) dormancy, or the first signaling comprises a DCI format indicating a Transmission Configuration Indication (TCI) state update.

In one embodiment, the first signaling carries a DCI format, and the DCI format carried by the first signaling has associated HARQ-ACK information but does not have a scheduling PDSCH.

In one embodiment, the first signaling comprises all or part of a DCI format that can simultaneously schedule multiple serving cells.

In one embodiment, the first signaling comprises all or part of a DCI format that can simultaneously schedule PDSCHs on multiple serving cells or a Physical Uplink Shared Channels (PUSCHs) on multiple serving cells.

In one embodiment, the first signaling comprises all or part of a DCI format that can only schedule a PDSCH or a PUSCH on one serving cell.

In one embodiment, at least one field comprised in a DCI format carried by the first signaling is set as a pre-defined value.

In one embodiment, a size of a DCI format carried by the first signaling is related to a number of serving cell(s) comprised in the first cell set.

In one embodiment, any two serving cells comprised in the first cell set are different.

In one embodiment, serving cells comprised in the first cell set consist of a cell list.

In one embodiment, the first cell set is a cell list.

In one embodiment, the first cell set is a set of serving cells to which PDSCHs that can be scheduled by a DCI format or a PDCCH at the same time respectively belong.

In one embodiment, the first cell set is a set of serving cells that can be scheduled by a DCI format or a PDCCH at the same time.

In one embodiment, the first cell set is a set of serving cells to which SPS PDSCHs that can be released by a DCI format or a PDCCH at the same time respectively belong.

In one embodiment, the first cell set is a set of serving cells to which SPS PDSCHs that can be activated by a DCI format or a PDCCH at the same time respectively belong.

In one embodiment, the first cell set is a set of serving cells that can be indicated as dormant by a DCI format or a PDCCH at the same time.

In one embodiment, the first cell set is a set of serving cells that can be indicated TCI state update by a DCI format or a PDCCH at the same time.

In one embodiment, all serving cells comprised in the first cell set belong to a same band.

In one embodiment, all serving cells comprised in the first cell set belong to a same frequency range (FR).

In one embodiment, all serving cells comprised in the first cell set adopt a same duplex mode (Time Division Duplexing (TDD) or Frequency Division Duplexing (FDD)).

In one embodiment, two serving cells comprised in the first cell set respectively belong to different bands.

In one embodiment, two serving cells comprised in the first cell set respectively belong to different frequency ranges.

In one embodiment, two serving cells comprised in the first cell set respectively adopt different duplex modes.

In one embodiment, the first cell set comprises two intra-band serving cells.

In one embodiment, the first cell set comprises two inter-band serving cells.

In one embodiment, all serving cells other than a self-scheduled cell comprised in the first cell set belong to a same band or a same frequency range.

In one embodiment, all serving cells other than a self-scheduled cell comprised in the first cell set adopt a same duplex mode (TDD or FDD).

In one embodiment, the technical feature that "the first signaling corresponds to a first cell set" comprises the following meaning: the first signaling is used to determine the first cell set.

In one embodiment, the technical feature that "the first signaling corresponds to a first cell set" comprises the following meaning: a higher-layer signaling or a higher-layer parameter is used to explicitly or implicitly indicate that the first signaling corresponds to (or is associated with) the first cell set.

In one embodiment, the technical feature that "the first signaling corresponds to a first cell set" comprises the following meaning: all or part comprised in the first signaling is used to explicitly or implicitly indicate the first cell set.

In one embodiment, the technical feature that "the first signaling corresponds to a first cell set" comprises the following meaning: all or part comprised in the first signaling is used to explicitly or implicitly indicate the first cell set from multiple cell sets.

In one embodiment, the technical feature that "the first signaling corresponds to a first cell set" comprises the following meaning: all or part comprised in the first information block is used to explicitly or implicitly indicate multiple cell sets, any of the multiple cell sets comprises at least one serving cell, the first cell set is one of the multiple cell sets, and all or part comprised in the first signaling is used to explicitly or implicitly indicate an index or an identity or an assigned indication value of the first cell set in the multiple cell sets.

In one embodiment, the technical feature that "the first signaling corresponds to a first cell set" comprises the following meaning: all or part of the first signaling is used to explicitly or implicitly indicate an index value or an identity value or an assigned indication value of the first cell set.

In one embodiment, the technical feature that "the first signaling corresponds to a first cell set" comprises the following meaning: all or part comprised in the first signaling is used to explicitly or implicitly indicate the at least one serving cell comprised in the first cell set.

In one embodiment, the technical feature that "the first signaling corresponds to a first cell set" comprises the following meaning: a DCI format carried by the first signaling can schedule all or partial serving cells comprised in the first cell set at the same time.

In one embodiment, the technical feature that "the first signaling corresponds to a first cell set" comprises the following meaning: a DCI format carried by the first signaling can schedule PDSCHs on all or partial serving cells comprised in the first cell set at the same time.

In one embodiment, the technical feature that "the first signaling corresponds to a first cell set" comprises the following meaning: a DCI format carried by the first signaling can release SPS PDSCHs on all or partial serving cells comprised in the first cell set at the same time.

In one embodiment, the technical feature that "the first signaling corresponds to a first cell set" comprises the following meaning: a DCI format carried by the first signaling can activate SPS PDSCHs on all or partial serving cells comprised in the first cell set at the same time.

In one embodiment, the technical feature that "the first signaling corresponds to a first cell set" comprises the following meaning: a DCI format carried by the first signaling can indicate dormancy of all or partial serving cells comprised in the first cell set.

In one embodiment, the technical feature that "the first signaling corresponds to a first cell set" comprises the following meaning: a DCI format carried by the first signaling can indicate a TCI state update of all or partial serving cells comprised in the first cell set.

In one embodiment, the target slot is a slot corresponding to an SCS.

In one embodiment, the target slot is a slot corresponding to an SCS of a subcarrier occupied by the first signal.

In one embodiment, the target slot is an uplink slot.

In one embodiment, the target slot is a slot at least comprising an uplink time-domain symbol.

In one embodiment, the target slot is a slot at least comprising a time-domain symbol that can be used for uplink transmission.

In one embodiment, the target slot comprises an uplink time-domain symbol and a flexible time-domain symbol.

In one embodiment, the target slot only comprises an uplink time-domain symbol.

In one embodiment, the target slot is a slot at least comprising an uplink time-domain symbol or at least comprising a flexible time-domain symbol.

In one embodiment, the target slot comprises a downlink time-domain symbol, a flexible time-domain symbol and an uplink time-domain symbol.

In one embodiment, the target slot and the reference slot corresponds to a same SCS.

In one embodiment, the target slot is a slot corresponding to an SCS of a subcarrier occupied by the first signaling.

In one embodiment, the first signal occupies all or part of the target slot in time domain.

In one embodiment, any time-domain symbol occupied by the first signal in time domain belongs to the target slot.

In one embodiment, the first signal is a radio signal or a radio frequency (RF) signal.

In one embodiment, the first signal is a baseband signal.

In one embodiment, the first signal is transmitted via an air interface or a radio interface.

In one embodiment, the first signal is transmitted via a Uu interface or a PC5 interface.

In one embodiment, a receiver of the first signal comprises the second node in the present application.

In one embodiment, the first signal is transmitted through a Physical Uplink Control Channel (PUCCH) or a Physical Uplink Shared Channel (PUSCH).

In one embodiment, the first signal is transmitted through a PUSCH of a Configured Grant (CG).

In one embodiment, the first signal comprises a PUCCH and a reference signal.

In one embodiment, the first signal comprises a PUSCH and a reference signal.

In one embodiment, the first HARQ bit block is a HARQ-ACK codebook.

In one embodiment, the first HARQ bit block is a HARQ-ACK sub-codebook.

In one embodiment, the first HARQ bit block is a Type1 or Type2 or Type3 HARQ-ACK codebook.

In one embodiment, the first HARQ bit block is transmitted on the first signal.

In one embodiment, the first HARQ bit block is carried as an information bit by the first signal.

In one embodiment, the first HARQ bit block is used to generate a UCI bit carried by the first signal.

In one embodiment, a UCI bit carried by the first signal comprises the first HARQ bit block.

In one embodiment, a UCI bit comprising the first HARQ bit block is used to generate the first signal.

In one embodiment, any HARQ-ACK bit comprised in the first HARQ bit block is an information bit.

In one embodiment, any HARQ-ACK bit comprised in the first HARQ bit block is a HARQ-ACK bit that is not coded.

In one embodiment, any HARQ-ACK bit comprised in the first HARQ bit block is a HARQ-ACK bit that is coded.

In one embodiment, the first HARQ bit block comprises multiple HARQ-ACK codebooks.

In one embodiment, the first HARQ bit block only comprises one HARQ-ACK codebook.

In one embodiment, the first HARQ bit block is one of multiple HARQ-ACK codebooks carried by the first signal.

In one embodiment, bits in the first HARQ bit block are arranged in order.

In one embodiment, bits in the first HARQ bit block are indexed in order.

In one embodiment, the first signal only carries a HARQ-ACK codebook.

In one embodiment, the first signal carries multiple HARQ-ACK codebooks.

In one embodiment, the first signal only carries a HARQ-ACK bit comprised in the first HARQ bit block.

In one embodiment, a UCI bit carried in the first signal only comprises a HARQ-ACK bit comprised in the first HARQ bit block.

In one embodiment, the first signal also carries a HARQ-ACK bit other than a HARQ-ACK bit comprised in the first HARQ bit block.

In one embodiment, the first signal also carries a UCI bit other than a HARQ-ACK bit comprised in the first HARQ bit block.

In one embodiment, the target HARQ-ACK bit is a HARQ-ACK bit comprised in the first HARQ bit block.

In one embodiment, the first HARQ bit block comprises the target HARQ-ACK bit.

In one embodiment, a bit value of the target HARQ-ACK bit represents "ACK".

In one embodiment, a bit value of the target HARQ-ACK bit is equal to "1".

In one embodiment, the technical feature that "a detection on the first signaling is used to determine a bit value of the target HARQ-ACK bit" comprises the following meaning: a detection on the first signaling is used by the first node in the present application to determine a bit value of the target HARQ-ACK bit.

In one embodiment, the technical feature that "a detection on the first signaling is used to determine a bit value of the target HARQ-ACK bit" comprises the following meaning: when the first signaling is detected, the first node generates "ACK" as a bit value of the target HARQ-ACK bit.

In one embodiment, the technical feature that "a detection on the first signaling is used to determine a bit value of the target HARQ-ACK bit" comprises the following meaning: when the first signaling is detected, a bit value of the target HARQ-ACK bit is equal to "1".

In one embodiment, the technical feature that "a detection on the first signaling is used to determine a bit value of the target HARQ-ACK bit" comprises the following meaning: when the first signaling is detected, a bit value of the target HARQ-ACK bit is equal to "1"; otherwise a bit value of the target HARQ-ACK bit is equal to "0".

In one embodiment, the technical feature that "a detection on the first signaling is used to determine a bit value of the target HARQ-ACK bit" comprises the following meaning: whether the first signaling is successfully detected is used to determine a bit value of the target HARQ-ACK bit.

In one embodiment, the technical feature that "a detection on the first signaling is used to determine a bit value of the target HARQ-ACK bit" comprises the following meaning: a successful decoding of the first signaling is used to determine a bit value of the target HARQ-ACK bit.

In one embodiment, the technical feature that "a detection on the first signaling is used to determine a bit value of the target HARQ-ACK bit" comprises the following meaning: a detection on the first signaling is used to determine that a bit value of the target HARQ-ACK bit is equal to "1".

In one embodiment, the technical feature that "a detection on the first signaling is used to determine a bit value of the target HARQ-ACK bit" comprises the following meaning: a reception of the first signaling is used to determine a bit value of the target HARQ-ACK bit.

In one embodiment, the reference slot is an uplink slot.

In one embodiment, the reference slot is a downlink slot.

In one embodiment, the reference slot is a virtual uplink slot.

In one embodiment, the reference slot is a slot at least comprising an uplink time-domain symbol or at least comprising a flexible time-domain symbol.

In one embodiment, the reference slot is a slot at least comprising a time-domain symbol that can be used for an uplink transmission.

In one embodiment, the reference slot is a slot at least comprising a time-domain symbol that can be used for a downlink transmission.

In one embodiment, the reference slot comprises an uplink time-domain symbol and a flexible time-domain symbol.

In one embodiment, the reference slot only comprises an uplink time-domain symbol.

In one embodiment, the reference slot comprises a downlink time-domain symbol, a flexible time-domain symbol and an uplink time-domain symbol.

In one embodiment, the technical feature that "time-domain resources occupied by the first signaling are used to determine a reference slot" comprises the following meaning: time-domain resources occupied by the first signaling are used by the first node in the present application to determine the reference slot.

In one embodiment, the technical feature that "time-domain resources occupied by the first signaling are used to determine a reference slot" comprises the following meaning: time-domain resources occupied by the first signaling belong to a first slot, and the reference slot is an uplink slot overlapping (fully or partially overlapping) with the first slot.

In one embodiment, the technical feature that "time-domain resources occupied by the first signaling are used to determine a reference slot" comprises the following meaning: time-domain resources occupied by the first signaling belong to a first slot, and the reference slot is a latest uplink slot overlapping (fully or partially overlapping) with the first slot.

In one embodiment, the technical feature that "time-domain resources occupied by the first signaling are used to determine a reference slot" comprises the following meaning: the reference slot is a latest slot comprising all or partial time-domain resources occupied by the first signaling.

In one embodiment, the technical feature that "time-domain resources occupied by the first signaling are used to determine a reference slot" comprises the following meaning: the reference slot is a slot to which time-domain resources occupied by the first signaling belong.

In one embodiment, the technical feature that "time-domain resources occupied by the first signaling are used to determine a reference slot" comprises the following meaning: the reference slot is an uplink slot with an index equal to a downlink slot to which the first signaling belongs in time domain.

In one embodiment, the technical feature that "time-domain resources occupied by the first signaling are used to determine a reference slot" comprises the following meaning: the reference slot is a latest slot overlapping (all or partially overlapping) with a downlink slot to which the first signaling belongs in time domain and corresponding to an SCS of a subcarrier occupied by the first signal.

In one embodiment, the technical feature that "time-domain resources occupied by the first signaling are used to determine a reference slot" comprises the following meaning: the reference slot is a latest uplink slot overlapping (all or partially overlapping)) with time-domain resources occupied by the first signaling in time domain.

In one embodiment, the technical feature that "time-domain resources occupied by the first signaling are used to determine a reference slot" comprises the following meaning: the reference slot is a latest slot overlapping (all or partially overlapping) with time-domain resources occupied by the first signaling in time domain and corresponding to an SCS of a subcarrier occupied by the first signal.

In one embodiment, a number of slot(s) between the reference slot and the target slot is a number of slot(s) comprised in a time interval from a start time of the reference slot to a start time of the target slot.

In one embodiment, a number of slot(s) between the reference slot and the target slot is a number of slot(s) comprised in a time interval from a start time of the reference slot to an end time of the target slot.

In one embodiment, a number of slot(s) between the reference slot and the target slot is a number of slot(s) comprised in a time interval from an end time of the reference slot to a start time of the target slot.

In one embodiment, a number of slot(s) between the reference slot and the target slot is a number of slot(s) comprised in a time interval from an end time of the reference slot to an end time of the target slot.

In one embodiment, a number of slot(s) between the reference slot and the target slot can be equal to 0.

In one embodiment, the reference slot is not later than the target slot.

In one embodiment, a number of slot(s) between the reference slot and the target slot is a difference value between an index of the target slot and an index of the reference slot.

In one embodiment, a number of slot(s) between the reference slot and the target slot is a number of slot(s) comprised in a time interval between the reference slot and the target slot and corresponding to a same SCS with the reference slot.

In one embodiment, a number of slot(s) between the reference slot and the target slot is a number of slot(s) comprised in a time interval between the reference slot and the target slot and corresponding to an SCS of a subcarrier occupied by the first signal.

In one embodiment, the technical feature that "the first signaling is used to determine a number of slot(s) between the reference slot and the target slot" comprises the following meaning: the first signaling is used by the first node in the present application to determine a number of slot(s) between the reference slot and the target slot.

In one embodiment, the technical feature that "the first signaling is used to determine a number of slot(s) between the reference slot and the target slot" comprises the following meaning: all or part comprised in the first signaling is used to explicitly or implicitly indicate a number of slot(s) between the reference slot and the target slot.

In one embodiment, the technical feature that "the first signaling is used to determine a number of slot(s) between the reference slot and the target slot" comprises the following meaning: all or part comprised in the first signaling is used to explicitly or implicitly indicate a number of slot(s) between the reference slot and the target slot from multiple candidate numbers.

In one embodiment, the technical feature that "the first signaling is used to determine a number of slot(s) between the reference slot and the target slot" comprises the following meaning: all or part comprised in the first signaling is used to explicitly or implicitly indicate the first delay value in the present application from the target delay set in the present application.

In one embodiment, the technical feature that "the first signaling is used to determine a number of slot(s) between the reference slot and the target slot" comprises the following meaning: a first delay value is equal to a number of slot(s) between the reference slot and the target slot, and the first delay value is an integer; the first delay value is a delay value comprised in a target delay set, the target delay set comprises at least one delay value, and any delay value comprised in the target delay set is an integer; a DCI format carried by the first signaling is used to determine the target delay set.

In one embodiment, the technical feature that "the first signaling is used to determine a number of slot(s) between the reference slot and the target slot" comprises the following meaning: all or part comprised in the first signaling is used to explicitly or implicitly indicate a number of slot(s) between the reference slot and the target slot from a configured number list, and the configured number list comprises at least one number value.

In one embodiment, the technical feature that "a time length of the reference slot is related to an SCS of a subcarrier occupied by the first signal" comprises the following meaning: a configuration of an SCS of a subcarrier occupied by the first signal is used to determine a time length of the reference slot.

In one embodiment, the technical feature that "a time length of the reference slot is related to an SCS of a subcarrier occupied by the first signal" comprises the following meaning: a time length and a configuration of the reference slot are related to an SCS of a subcarrier occupied by the first signal.

In one embodiment, the technical feature that "a time length of the reference slot is related to an SCS of a subcarrier occupied by the first signal" comprises the following meaning: a configuration of an SCS of a subcarrier occupied by the first signal is used to determine a time length of any time-domain symbol comprised in the reference slot.

In one embodiment, the technical feature that "a time length of the reference slot is related to an SCS of a subcarrier occupied by the first signal" comprises the following meaning: a configuration of an SCS of a subcarrier occupied by the first signal is used to determine a number of $T_c$(s) comprised in any time-domain symbol comprised in the reference slot, where $T_c=1/(480\cdot 10^3\cdot 4096)$s.

In one embodiment, the technical feature that "a time length of the reference slot is related to an SCS of a subcarrier occupied by the first signal" comprises the following meaning: a time length of any time-domain symbol comprised in the reference slot is linearly correlated with a power of 2 with a configuration index of an SCS of a subcarrier occupied by the first signal as an exponent.

In one embodiment, the technical feature that "a reference serving cell is a serving cell related to the first cell set" comprises the following meaning: the reference serving cell is a pre-defined serving cell comprised in the first cell set.

In one embodiment, the technical feature that "a reference serving cell is a serving cell related to the first cell set" comprises the following meaning: the reference serving cell is a serving cell comprised in the first cell set.

In one embodiment, the technical feature that "a reference serving cell is a serving cell related to the first cell set" comprises the following meaning: the reference serving cell is a common scheduling cell for all serving cells comprised in the first cell set.

In one embodiment, the technical feature that "a reference serving cell is a serving cell related to the first cell set" comprises the following meaning: the reference serving cell is a serving cell to which the first signaling belongs.

In one embodiment, the technical feature that "a reference serving cell is a serving cell related to the first cell set" comprises the following meaning: the reference serving cell is a serving cell configured for the first cell set.

In one embodiment, the technical feature that "a reference serving cell is a serving cell related to the first cell set" comprises the following meaning: the reference serving cell is used to represent a serving cell of the first cell set.

In one embodiment, the reference serving cell is a serving cell other than a serving cell comprised in the first cell set.

In one embodiment, the reference serving cell is a serving cell comprised in the first cell set.

In one embodiment, an index value of the reference serving cell is a value of a serving cell index of the reference serving cell.

In one embodiment, an index value of the reference serving cell is an identity of the reference serving cell.

In one embodiment, an index value of the reference serving cell is equal to a non-negative integer.

In one embodiment, an index value of the reference serving cell is equal to a positive integer.

In one embodiment, an index value of the reference serving cell is an index value or an identity value or an indication value configured to the reference serving cell.

In one embodiment, an index value of the reference serving cell is an order value that the reference serving cell is added to a cell group to which it belongs.

In one embodiment, an index value of the reference serving cell is an index value of the reference serving cell in a cell group to which it belongs.

In one embodiment, the reference serving cell belongs to the first cell set, and an index value of the reference serving cell is an index value of the reference serving cell in the first cell set.

In one embodiment, all or part comprised in the first signaling is used to explicitly or implicitly indicate the reference serving cell.

In one embodiment, a position of the target HARQ-ACK bit in the first HARQ bit block is an index of the target HARQ-ACK bit in the first HARQ bit block.

In one embodiment, a position of the target HARQ-ACK bit in the first HARQ bit block is an order of the target HARQ-ACK bit in the first HARQ bit block.

In one embodiment, bits in the first HARQ bit block are indexed in order, and a position of the target HARQ-ACK bit in the first HARQ bit block is an index of the target HARQ-ACK bit in the first HARQ bit block.

In one embodiment, bits in the first HARQ bit block are arranged in order, and a position of the target HARQ-ACK bit in the first HARQ bit block is an arrangement order of the target HARQ-ACK bit in the first HARQ bit block.

In one embodiment, the technical feature that "a position of the target HARQ-ACK bit in the first HARQ bit block is related to the reference serving cell" comprises the following meaning: an index of the reference serving cell is used to determine a position of the target HARQ-ACK bit in the first HARQ bit block.

In one embodiment, the technical feature that "a position of the target HARQ-ACK bit in the first HARQ bit block is related to the reference serving cell" comprises the following meaning: a position of the target HARQ-ACK bit in the first HARQ bit block is related to both an index value of the reference serving cell and a time-domain position of the first signaling.

In one embodiment, the technical feature that "a position of the target HARQ-ACK bit in the first HARQ bit block is related to the reference serving cell" comprises the following meaning: the first signaling carries a DCI format not used to schedule a PDSCH, and a position of the target HARQ-ACK bit in the first HARQ bit block is the same as a position of a HARQ-ACK bit of a PDSCH belonging to the reference serving cell and corresponding to the first signaling in the first HARQ bit block.

In one embodiment, the technical feature that "a position of the target HARQ-ACK bit in the first HARQ bit block is related to the reference serving cell" comprises the following meaning: an index of the reference serving cell is used to determine a position of the target HARQ-ACK bit in the first HARQ bit block according to a generation of type-1 HARQ-ACK codebook.

In one embodiment, the technical feature that "a position of the target HARQ-ACK bit in the first HARQ bit block is related to the reference serving cell" comprises the following meaning: an index of the reference serving cell is used to determine a position of a time-domain occasion corresponding to the first signaling, and a position of a time-domain occasion corresponding to the first signaling is used to determine a position of the target HARQ-ACK bit in the first HARQ bit block.

In one embodiment, the technical feature that "a position of the target HARQ-ACK bit in the first HARQ bit block is related to the reference serving cell" comprises the following meaning: any HARQ-ACK bit in the first HARQ bit block corresponds to an index of a time-domain occasion and an index of a serving cell, and the target HARQ-ACK bit corresponds to an index of a time-domain occasion occupied by the first signaling in a serving cell to which it belongs and an index of the reference serving cell.

In one embodiment, the technical feature that "a position of the target HARQ-ACK bit in the first HARQ bit block is related to the reference serving cell" comprises the following meaning: any HARQ-ACK bit in the first HARQ bit block corresponds to an index of a time-domain occasion and an index of a serving cell, and the target HARQ-ACK bit corresponds to an index of a time-domain occasion occupied by the first signaling in a serving cell to which it belongs and an index of a serving cell to which the first signaling belongs, and the reference serving cell is used to determine an index of a time-domain occasion occupied by the first signaling in a serving cell to which it belongs.

In one embodiment, the technical feature that "a position of the target HARQ-ACK bit in the first HARQ bit block is related to the reference serving cell" comprises the following meaning: any HARQ-ACK bit in the first HARQ bit block is a HARQ-ACK for a serving cell and belonging to a candidate time-domain occasion in the serving cell, the target HARQ-ACK bit is a HARQ-ACK for a serving cell to which the first signaling belongs and of a time-domain occasion occupied by the first signaling in a serving cell to which it belongs, and the reference serving cell is used to determine a time-domain occasion occupied by the first signaling in a serving cell to which it belongs.

In one embodiment, the technical feature that "a position of the target HARQ-ACK bit in the first HARQ bit block is related to the reference serving cell" comprises the following meaning: any HARQ-ACK bit in the first HARQ bit block is a HARQ-ACK for a serving cell and belonging to a candidate time-domain occasion in the serving cell, the target HARQ-ACK bit is a HARQ-ACK for a serving cell to which the first signaling belongs and of a time-domain occasion occupied by the first signaling in a serving cell to which it belongs, and a Time domain resource assignment (TDRA) in the reference serving cell is used to determine a time-domain occasion occupied by a serving cell to which the first signaling belongs.

In one embodiment, the technical feature that "a position of the target HARQ-ACK bit in the first HARQ bit block is related to the reference serving cell" comprises the following meaning: any HARQ-ACK bit in the first HARQ bit block is a HARQ-ACK for a serving cell and belonging to a candidate time-domain occasion in the serving cell, the target HARQ-ACK bit is a HARQ-ACK for a serving cell to which the first signaling belongs and of a time-domain occasion occupied by the first signaling in a serving cell to which it belongs, and a row index in a time-domain resource assignment table belonging to the reference serving cell is used to determine a time-domain occasion occupied by the first signaling in a serving cell to which it belongs.

In one embodiment, the technical feature that "a position of the target HARQ-ACK bit in the first HARQ bit block is related to the reference serving cell" comprises the following meaning: any HARQ-ACK bit in the first HARQ bit block is a HARQ-ACK for a serving cell and belonging to a candidate time-domain occasion in the serving cell, the target HARQ-ACK bit is a HARQ-ACK for a serving cell to which the first signaling belongs and of a time-domain occasion occupied by the first signaling in a serving cell to which it belongs, and a row index in a time-domain resource assignment table corresponding to an SPS configuration with a smallest index value belonging to the reference serving cell is used to determine a time-domain occasion occupied by the first signaling in a serving cell to which it belongs.

In one embodiment, the technical feature that "a position of the target HARQ-ACK bit in the first HARQ bit block is related to the reference serving cell" comprises the following meaning: a position of the target HARQ-ACK bit in the first HARQ bit block is related to a row index in a time-domain resource assignment table in the reference serving cell.

In one embodiment, the technical feature that "a position of the target HARQ-ACK bit in the first HARQ bit block is related to the reference serving cell" comprises the following meaning: a position of the target HARQ-ACK bit in the first HARQ bit block is related to a row index in a time-domain resource assignment table corresponding to an SPS configuration in the reference serving cell.

In one embodiment, the technical feature that "a position of the target HARQ-ACK bit in the first HARQ bit block is related to the reference serving cell" comprises the following meaning: a position of the target HARQ-ACK bit in the first HARQ bit block is related to a row index in a time-domain resource assignment table corresponding to an SPS configuration with a smallest index value in the reference serving cell.

In one embodiment, the first receiver receives a second signaling; herein, the second signaling is used to determine a TDRA configured for an SPS in the reference serving cell, the TDRA corresponds to a row index in a time-domain resource assignment table, and a position of the target HARQ-ACK bit in the first HARQ bit block is related to a value of a row index in a time-domain resource assignment table corresponding to the TDRA. In one subsidiary embodiment of the above embodiment, the second signaling is transmitted through a PDCCH. In one subsidiary embodiment of the above embodiment, the second signaling carries a DCI format. In one subsidiary embodiment of the above embodiment, the second signaling is used for an activation of an SPS PDSCH. In one subsidiary embodiment of the above embodiment, the SPS configuration is an SPS configuration with a smallest index value. In one subsidiary embodiment of the above embodiment, the SPS configuration is an SPS configuration with a greatest index value.

In one embodiment, the first signaling is used to determine a TDRA configured for an SPS in the reference serving cell, the TDRA corresponds to a row index in a time-domain resource assignment table, and a position of the target HARQ-ACK bit in the first HARQ bit block is related to a value of a row index in a time-domain resource assignment table corresponding to the TDRA. In one subsidiary embodiment of the above embodiment, the SPS configuration is an SPS configuration with a smallest index value. In one subsidiary embodiment of the above embodiment, the SPS configuration is an SPS configuration with a greatest index value.

In one embodiment, the first signaling is used to determine a row index in a time-domain resource assignment table corresponding to an SPS configuration belonging to the reference serving cell.

In one embodiment, a signaling other than the first signaling is used to determine a row index in a time-domain resource assignment table corresponding to an SPS configuration belonging to the reference serving cell.

In one embodiment, the technical feature that "a position of the target HARQ-ACK bit in the first HARQ bit block is related to the reference serving cell" comprises the following meaning: time-domain resources occupied by the first signaling belong to a first time-domain occasion, the first time-domain occasion is a time-domain occasion comprised in a first occasion set, the first occasion set is one of M2 occasion sets, and any of the M2 occasion sets comprise at least one time-domain occasion, M2 being a positive integer greater than 1; the M2 occasion sets respectively correspond to M2 serving cells, the reference serving cell is one of the M2 serving cells, and the first occasion set is an occasion set corresponding to the reference serving cell; the M2 serving cells are indexed in order, and time-domain occasions comprised in the first occasion set are indexed in order, M2 being a positive integer greater than 1; HARQ-ACK bits comprised in the first HARQ bit block are indexed in order, any time-domain occasion comprised in any of the M2 occasion sets corresponds to at least one HARQ-ACK bit in the first HARQ bit block, the target HARQ-ACK bit is a HARQ-ACK bit corresponding to the first time-domain occasion in the first HARQ bit block, and an index of the target HARQ-ACK bit in the first HARQ bit block is related to both an index of a serving cell corresponding to the first occasion set and an index of the first time-domain occasion in the first occasion set.

Embodiment 2

Figure 2:
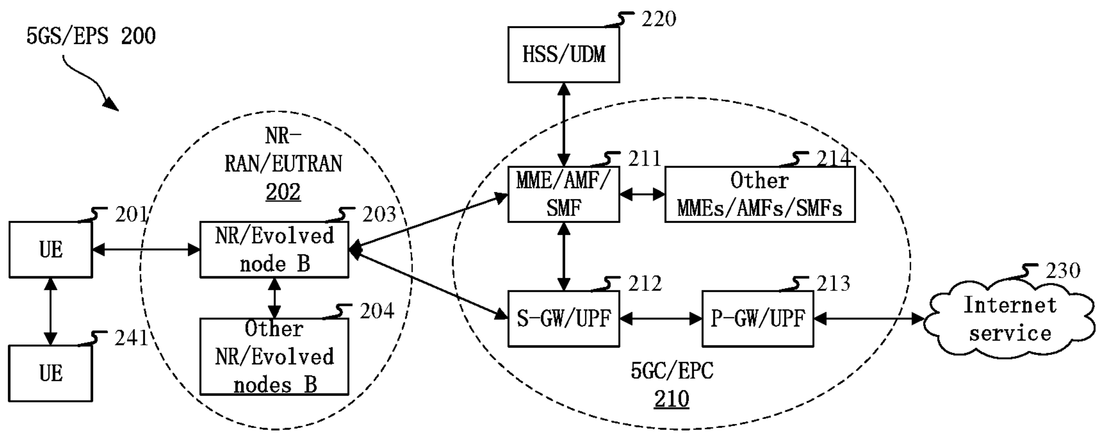
FIG. 2 illustrates a schematic diagram of a network architecture according to one embodiment of the present application.

Embodiment 2 illustrates a schematic diagram of a network architecture according to the present application, as shown in FIG. 2. FIG. 2 illustrates a network architecture 200 of 5G NR, Long-Term Evolution (LTE) and Long-Term Evolution Advanced (LTE-A) systems. The 5G NR or LIE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN comprises an NR/evolved node B (gNB/eNB) 203 and other gNBs (eNBs) 204. The gNB (eNB) 203 provides UE 201-oriented user plane and control plane protocol terminations. The gNB(eNB) 203 may be connected to other gNBs (eNBs) 204 via an Xn/X2 interface (e.g., backhaul). The gNB(eNB) 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB(eNB) 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB(eNB) 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the gNB(eNB) 201 corresponds to the second node in the present application.

Embodiment 3

Figure 3:
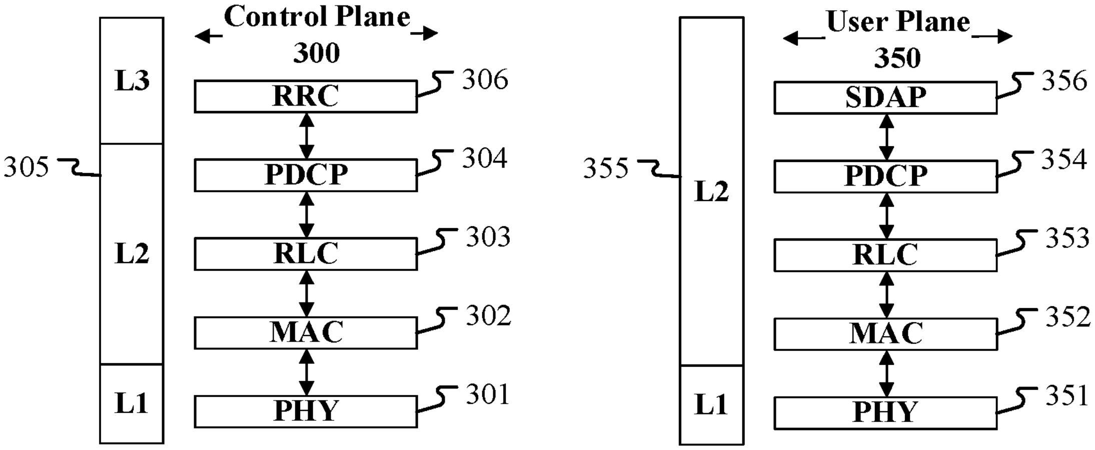
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first node (UE or gNB) and a second node (gNB or UE) is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of the link between the first node and the second node via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second node and a first node. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

Embodiment 4

Figure 4:
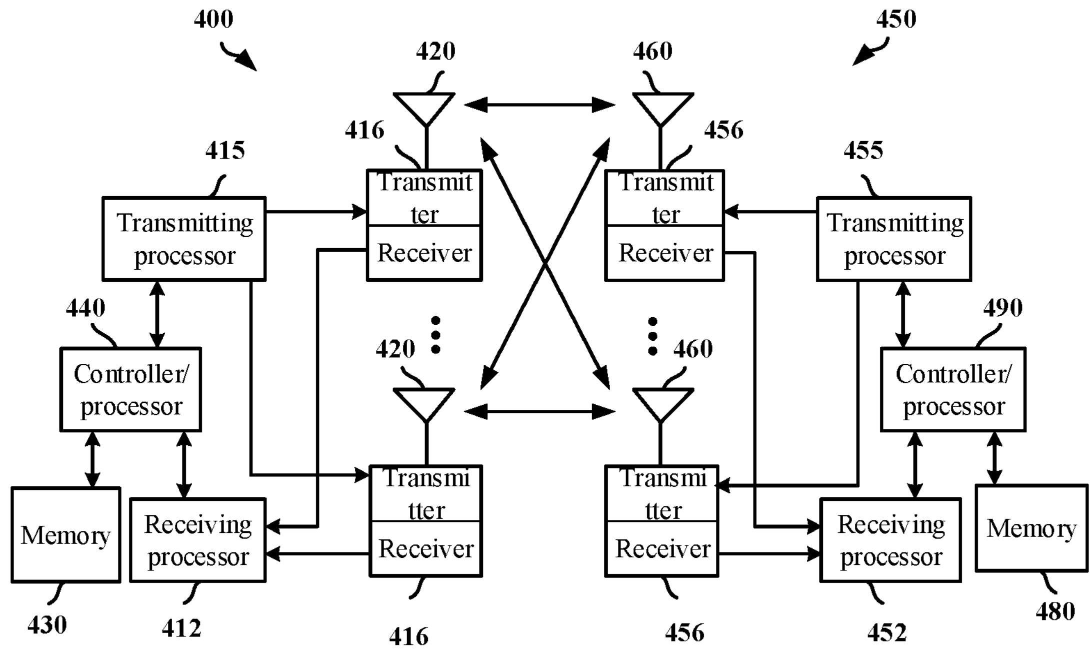
FIG. 4 illustrates a schematic diagram of a first node and a second node according to one embodiment of the present application.

Embodiment 4 illustrates a schematic diagram of a first node and a second node according to one embodiment of the present application, as shown in FIG. 4.

The first node (450) may comprise a controller/processor 490, a data source/buffer 480, a receiving processor 452, a transmitter/receiver 456 and a transmitting processor 455, wherein the transmitter/receiver 456 comprises an antenna 460.

The second node (410) may comprise a controller/processor 440, a data source/buffer 430, a receiving processor 412, a transmitter/receiver 416 and a transmitting processor 415, wherein the transmitter/receiver 416 comprises an antenna 420.

In Downlink (DL) transmission, a higher layer packet (for example, higher layer information comprised in the first information block in the present application) is provided to the controller/processor 440. The controller/processor 440 implements the functionality of the L2 layer and the higher layer. In DL transmission, the controller/processor 440 provides header compression, encryption, packet segmentation and reordering and multiplexing between a logical channel and a transport channel, as well as radio resource allocation for the first node 450 based on varied priorities. The controller/processor 440 is also in charge of HARQ operation, retransmission of a lost packet, and a signaling to the first node 450, for instance, higher-layer information comprised in the first information block in the present application are all generated in the controller/processor 440. The transmitting processor implements various signal processing functions used for L1 layer (that is, physical layer), including encoding, interleaving, scrambling, modulation, power control/allocation, precoding, and physical layer control signaling generation, for example, the generation of the physical layer signal carrying the first information block in the present application and the physical layer signal corresponding to the first signaling is completed at the transmission processor 415. The generated modulation symbols are divided into parallel streams and each stream is mapped onto a corresponding multicarrier subcarrier and/or a multicarrier symbol, which is later mapped from the transmitting processor 415 to the antenna 420 via the transmitter 416 in the form of a radio frequency signal. At the receiving side, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer. The signal receiving and processing function includes receiving a physical-layer signal carrying the first information block and the first signaling in the present application, demodulating based on various modulation schemes (e.g., BPSK, and QPSK) via a multicarrier symbol in a multicarrier symbol stream, then descrambling, decoding and de-interleaving to recover data or a control signal transmitted by the second node 410 on a physical channel, and providing the data and the control signal to the controller/processor 490. The controller/processor 490 is in charge of the function of L2 layer and above layers, and the controller/processor 490 interprets higher layer information comprised in the first information block in the present application. The controller/processor can be connected to a memory 480 that stores program code and data. The memory 480 may be called a computer readable medium.

In uplink (UL) transmission, similar to downlink transmission, the higher-layer information comprises higher-layer information comprised in the first signal in the present application (if the first signal comprises higher-layer information), which is generated at the controller/processor 490 and then is implemented by the transmitting processor 455 for various signal transmission processing functions in the L1 layer (i.e., the physical layer), including that the generation of the physical-layer signal carrying the first signal is completed at the transmitting processor 455, and then is mapped from the transmitting processor 455 to the antenna 460 via the transmitter 456 to be transmitted in the form of RF signal. The receiver 416 receives a radio-frequency signal via its corresponding antenna 420, and each receiver 416 recovers baseband information modulated to a radio-frequency carrier, and supplies the baseband information to the receiving processor 412. The receiving processor 412 implements various signal receiving and processing functions for the L1 layer (i.e., the physical layer), including receiving and processing the physical layer signal carrying the first signal, and then providing the data and/or control signal to the controller/processor 440. The function of implementing L2 layer at controller/processor 440 comprises interpreting the higher-layer information, comprising an interpretation of higher-layer information carried by the first signal (if the first signal carries higher-layer information). The controller/processor can be connected to a buffer 430 that stores program code and data. The buffer 430 may be called a computer readable medium.

In one embodiment, the first node 450 comprises at least one processor and at least one memory. The at least one memory comprises computer program codes; the at least one memory and the computer program codes are configured to be used in collaboration with the at least one processor. The first node 450 at least: receives a first information block and receives a first signaling, the first signaling corresponds to a first cell set, and the first cell set comprises multiple serving cells, the first information block is used to determine the first cell set; transmits a first signal in a target slot, the first signal carries a first HARQ bit block, the first HARQ bit block comprises multiple HARQ-ACK bits, the first HARQ bit block comprises a target HARQ-ACK bit, and a detection on the first signaling is used to determine a bit value of the target HARQ-ACK bit; time-domain resources occupied by the first signaling are used to determine a reference slot; the first signaling is used to determine a number of slot(s) between the reference slot and the target slot, and a time length of the reference slot is related to an SCS of a subcarrier occupied by the first signal; a reference serving cell is a serving cell related to the first cell set, and a position of the target HARQ-ACK bit in the first HARQ bit block is related to the reference serving cell.

In one embodiment, the first node 450 comprises a memory that stores a computer readable instruction program. The computer readable instruction program generates an action when executed by at least one processor. The action includes: receiving a first information block and receiving a first signaling, the first signaling corresponding to a first cell set, the first cell set comprising multiple serving cells, the first information block being used to determine the first cell set; transmitting a first signal in a target slot, the first signal carrying a first HARQ bit block, the first HARQ bit block comprising multiple HARQ-ACK bits, the first HARQ bit block comprising a target HARQ-ACK bit, a detection on the first signaling being used to determine a bit value of the target HARQ-ACK bit; time-domain resources occupied by the first signaling are used to determine a reference slot; the first signaling is used to determine a number of slot(s) between the reference slot and the target slot, and a time length of the reference slot is related to an SCS of a subcarrier occupied by the first signal; a reference serving cell is a serving cell related to the first cell set, and a position of the target HARQ-ACK bit in the first HARQ bit block is related to the reference serving cell.

In one embodiment, the second node 410 comprises at least one processor and at least one memory. The at least one memory comprises computer program codes; the at least one memory and the computer program codes are configured to be used in collaboration with the at least one processor. The second node 410 at least: transmits a first information block and transmits a first signaling, the first signaling corresponds to multiple serving cells, the first information block is used to determine the first cell set; receives a first signal in a target slot, the first signal carries a first HARQ bit block, the first HARQ bit block comprises multiple HARQ-ACK bits, the first HARQ bit block comprises a target HARQ-ACK bit, and a detection on the first signaling is used to determine a bit value of the target HARQ-ACK bit; herein, time-domain resources occupied by the first signaling are used to determine a reference slot; the first signaling is used to determine a number of slot(s) between the reference slot and the target slot, and a time length of the reference slot is related to an SCS of a subcarrier occupied by the first signal; a reference serving cell is a serving cell related to the first cell set, and a position of the target HARQ-ACK bit in the first HARQ bit block is related to the reference serving cell.

In one embodiment, the second node 410 comprises a memory that stores a computer readable instruction program. The computer readable instruction program generates an action when executed by at least one processor. The action includes: transmitting a first information block and transmitting a first signaling, the first signaling corresponding to a first cell set, the first cell set comprising multiple serving cells, the first information block being used to determine the first cell set; receiving a first signal in a target slot, the first signal carrying a first HARQ bit block, the first HARQ bit block comprising multiple HARQ-ACK bits, the first HARQ bit block comprising a target HARQ-ACK bit, a detection on the first signaling being used to determine a bit value of the target HARQ-ACK bit; herein, time-domain resources occupied by the first signaling are used to determine a reference slot; the first signaling is used to determine a number of slot(s) between the reference slot and the target slot, and a time length of the reference slot is related to an SCS of a subcarrier occupied by the first signal; a reference serving cell is a serving cell related to the first cell set, and a position of the target HARQ-ACK bit in the first HARQ bit block is related to the reference serving cell.

In one embodiment, the first node 450 is a UE.

In one embodiment, the second node 410 is a base station (gNB/eNB).

In one embodiment, the receiver 456 (including the antenna 460), the receiving processor 452 and the controller/processor 490 are used to receive the first information block in the present application.

In one embodiment, the receiver 456 (including the antenna 460) and the receiving processor 452 are used to receive the first signaling in the present application.

In one embodiment, the transmitter 456 (including the antenna 460), the transmitting processor 455 and the controller/processor 490 are to transmit the first signal in the present application.

In one embodiment, the transmitter 456 (including the antenna 460), and the transmitting processor 455 are used to transmit the first signal in the present application.

In one embodiment, the transmitter 416 (including the antenna 420), the transmitting processor 415 and the controller/processor 440 are used to transmit the first information block in the present application.

In one embodiment, the transmitter 416 (including the antenna 420) and the transmitting processor 415 are used to transmit the first signaling in the present application.

In one embodiment, the receiver 416 (including the antenna 420), the receiving processor 412 and the controller/processor 440 are used to receive the first signal in the present application.

In one embodiment, the receiver 416 (including the antenna 420) and the receiving processor 412 are used to receive the first signal in the present application.

Embodiment 5

Figure 5:
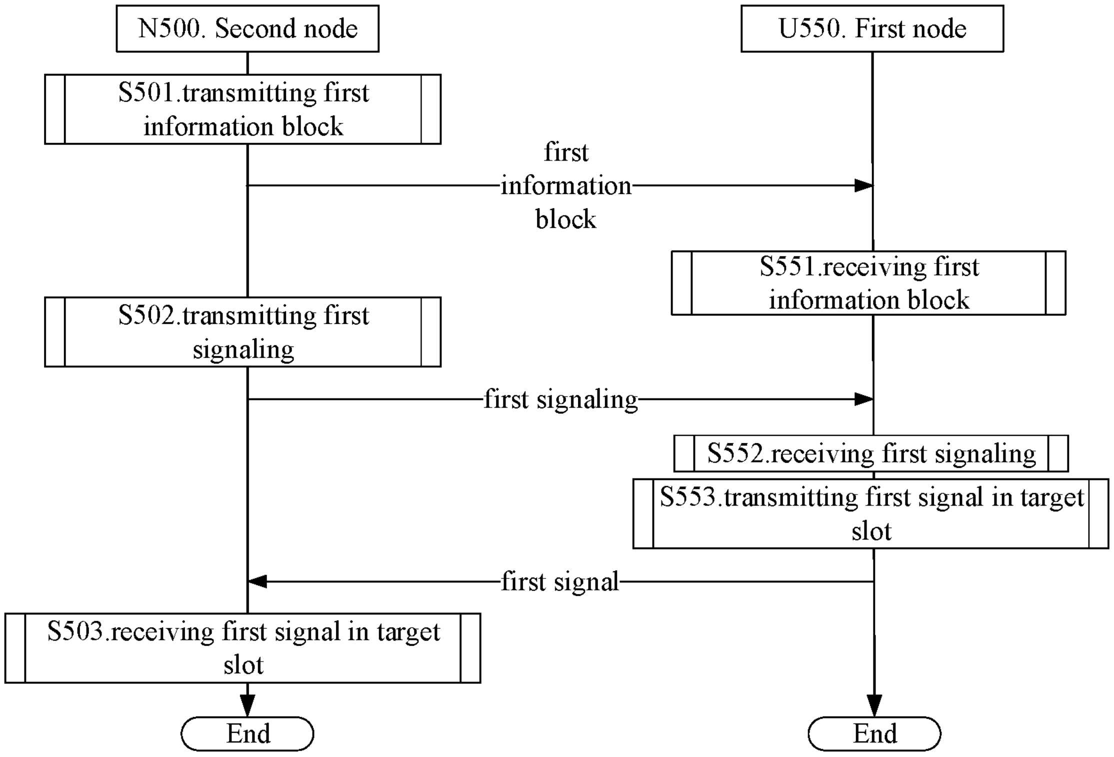
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, a second node N500 is a maintenance base station of a serving cell of a first node U550. It is particularly underlined that the order illustrated in the embodiment does not put constraints over sequences of signal transmissions and implementations.

The second node N500 transmits a first information block in step S501, transmits a first signaling in step S502, and receives a first signal in a target slot in step S503.

The first node U550 receives a first information block in step S551, receives a first signaling in step S552, and transmits a first signal in a target slot.

In embodiment 5, the first signaling corresponds to a first cell set, the first cell set comprises multiple serving cells, the first information block is used to determine the first cell set; the first signal carries a first HARQ bit block, the first HARQ bit block comprises multiple HARQ-ACK bits, the first HARQ bit block comprises a target HARQ-ACK bit, and a detection on the first signaling is used to determine a bit value of the target HARQ-ACK bit; time-domain resources occupied by the first signaling are used to determine a reference slot; the first signaling is used to determine a number of slot(s) between the reference slot and the target slot, and a time length of the reference slot is related to an SCS of a subcarrier occupied by the first signal; a reference serving cell is a serving cell related to the first cell set, and a position of the target HARQ-ACK bit in the first HARQ bit block is related to the reference serving cell.

Embodiment 6

Figures 6, 7, 8, 9:
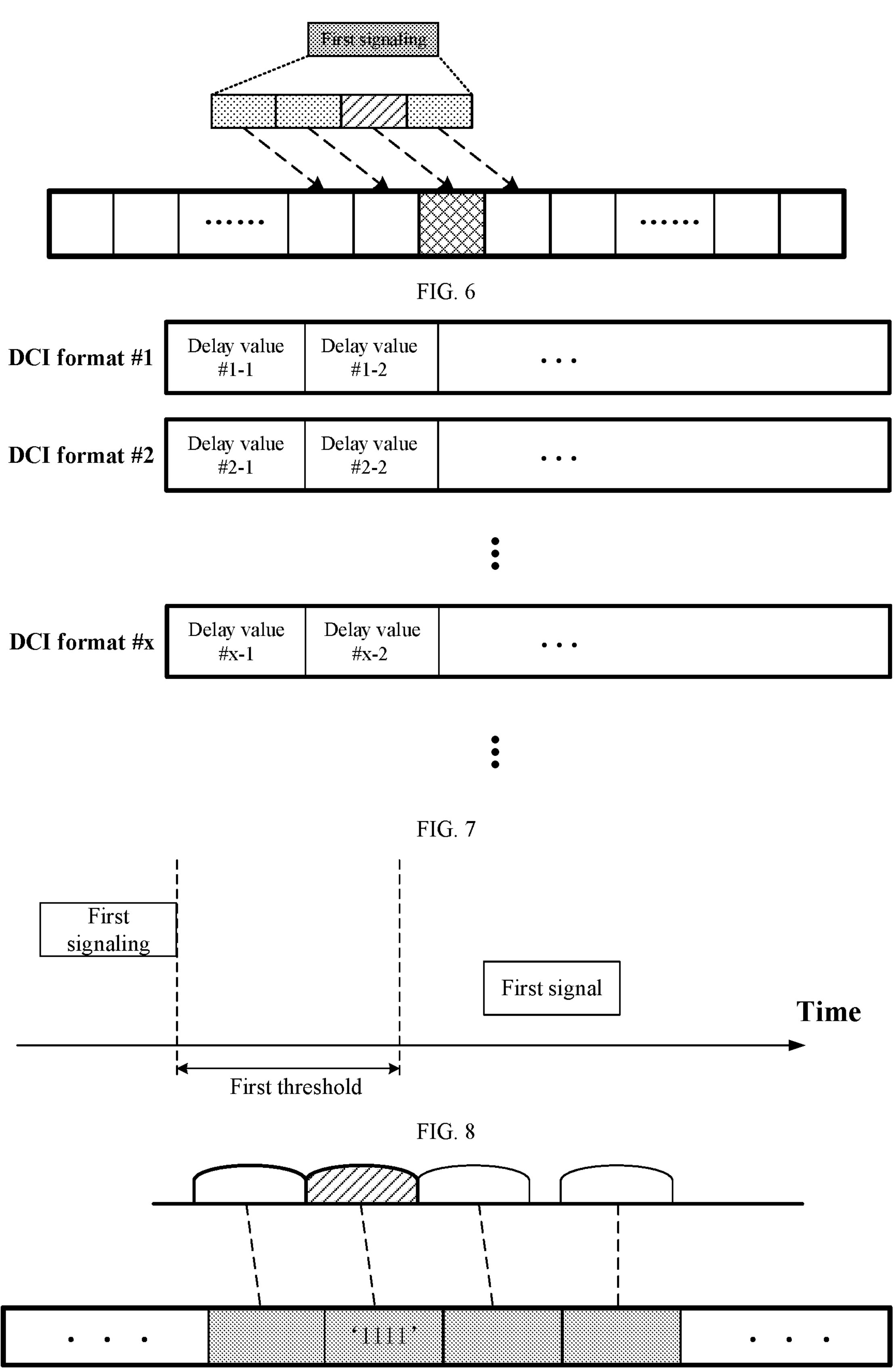
FIG. 6 illustrates a schematic diagram of a target HARQ-ACK bit according to one embodiment of the present application.
FIG. 7 illustrates a schematic diagram of a target delay set according to one embodiment of the present application.
FIG. 8 illustrates a schematic diagram of a first threshold according to one embodiment of the present application.
FIG. 9 illustrates a schematic diagram of a first field according to one embodiment of the present application.

Embodiment 6 illustrates a schematic diagram of a target HARQ-ACK bit according to one embodiment of the present application, as shown in FIG. 6. In FIG. 6, the thick wireframe rectangle represents a first HARQ bit block, each box in the thick wireframe rectangle represents a HARQ-ACK bit comprised in a first HARQ bit block, the cross-line filled rectangle represents a target HARQ-ACK bit, the gray-filled rectangle represents a first signaling, the dot-filled rectangle represents a corresponding PDSCH on a serving cell, and the slash-filled rectangle represents a corresponding PDSCH on a reference serving cell.

In embodiment 6, the reference serving cell in the present application is a predefined serving cell comprised in the first cell set in the present application, and the first signaling in the present application carries a DCI format, a DCI format carried by the first signaling comprises information other than PDSCH scheduling information; a position of the target HARQ-ACK bit in the present application in the first HARQ bit block in the present application is the same as a position of a HARQ-ACK bit of a PDSCH belonging to the reference serving cell and corresponding to the first signaling in the first HARQ bit block.

In one embodiment, the technical feature that "the reference serving cell is a per-defined serving cell comprised in the first cell set" comprises the following meaning: the reference serving cell is a serving cell with a largest serving cell index comprised in the first cell set.

In one embodiment, the technical feature that "the reference serving cell is a per-defined serving cell comprised in the first cell set" comprises the following meaning: the reference serving cell is a serving cell with a smallest serving cell index comprised in the first cell set.

In one embodiment, the technical feature that "the reference serving cell is a per-defined serving cell comprised in the first cell set" comprises the following meaning: the reference serving cell is a Special Cell comprised in the first cell set.

In one embodiment, the technical feature that "the reference serving cell is a per-defined serving cell comprised in the first cell set" comprises the following meaning: the reference serving cell is a Primary Cell comprised in the first cell set.

In one embodiment, the technical feature that "the reference serving cell is a per-defined serving cell comprised in the first cell set" comprises the following meaning: the reference serving cell is a Self-scheduling serving cell comprised in the first cell set.

In one embodiment, the technical feature that "the reference serving cell is a per-defined serving cell comprised in the first cell set" comprises the following meaning: the reference serving cell is a serving cell with a largest associated CIF value comprised in the first cell set.

In one embodiment, the technical feature that "the reference serving cell is a per-defined serving cell comprised in the first cell set" comprises the following meaning: the reference serving cell is a serving cell with a smallest associated CIF value comprised in the first cell set.

In one embodiment, the technical feature that "the reference serving cell is a per-defined serving cell comprised in the first cell set" comprises the following meaning: the reference serving cell is a serving cell with a largest SPS configuration index comprised in the first cell set.

In one embodiment, the technical feature that "the reference serving cell is a per-defined serving cell comprised in the first cell set" comprises the following meaning: the reference serving cell is a serving cell with a smallest SPS configuration index comprised in the first cell set.

In one embodiment, the technical feature that "the reference serving cell is a per-defined serving cell comprised in the first cell set" comprises the following meaning: the reference serving cell is a serving cell with a largest or smallest configured index value or identity value or indication value comprised in the first cell set.

In one embodiment, the technical feature that "the first signaling carries a DCI format" comprises the following meaning: the first signaling carries the first DCI format in the present application.

In one embodiment, the technical feature that "the first signaling carries a DCI format" comprises the following meaning: a payload comprised in a DCI format is transmitted through the first signaling.

In one embodiment, the technical feature that "the first signaling carries a DCI format" comprises the following meaning: an information bit comprised in a DCI format is transmitted through the first signaling.

In one embodiment, the technical feature that "the first signaling carries a DCI format" comprises the following meaning: a DCI format is used to generate the first signaling.

In one embodiment, the technical feature that "the first signaling carries a DCI format" comprises the following meaning: the first signaling carries all or partial fields in a DCI format.

In one embodiment, the technical feature that "the first signaling carries a DCI format" comprises the following meaning: the first signaling is a DCI format.

In one embodiment, the technical feature that "the first signaling carries a DCI format" comprises the following meaning: all or part of fields comprised in a DCI format are subjected to one or multiple of DCI size alignment, CRC attachment, channel coding, rate matching, scrambling, PDCCH modulation, mapping to physical resources, OFDM baseband signal generation as well as modulation and upconversion to generate the first signaling.

In one embodiment, the technical feature that "the first signaling carries a DCI format" comprises the following meaning: all or part of information bits comprised in a DCI format are subjected to one or multiple of DCI size alignment, CRC attachment, channel coding, rate matching, scrambling, PDCCH modulation, mapping to physical resources, OFDM baseband signal generation as well as modulation and upconversion to generate the first signaling.

In one embodiment, a DCI format carried by the first signaling is DCI format 1_3.

In one embodiment, a DCI format carried by the first signaling is DCI format 1_4.

In one embodiment, a DCI format carried by the first signaling is DCI format 1_5.

In one embodiment, a DCI format carried by the first signaling is DCI format 1_1a.

In one embodiment, a DCI format carried by the first signaling is DCI format 1_2a.

In one embodiment, the technical feature that "a DCI format carried by the first signaling comprises information other than PDSCH scheduling information" comprises the following meaning: a DCI format carried by the first signaling does not comprise PDSCH scheduling information.

In one embodiment, the technical feature that "a DCI format carried by the first signaling comprises information other than PDSCH scheduling information" comprises the following meaning: a DCI format carried by the first signaling does not schedule a PDSCH.

In one embodiment, the technical feature that "a DCI format carried by the first signaling comprises information other than PDSCH scheduling information" comprises the following meaning: a DCI carried by the first signaling is used for an SPS PDSCH release.

In one embodiment, the technical feature that "a DCI format carried by the first signaling comprises information other than PDSCH scheduling information" comprises the following meaning: a DCI carried by the first signaling is used for an SPS PDSCH activation.

In one embodiment, the technical feature that "a DCI format carried by the first signaling comprises information other than PDSCH scheduling information" comprises the following meaning: a DCI carried by the first signaling is used to indicate a Secondary Cell (SCell) dormancy In one embodiment, the technical feature that "a DCI format carried by the first signaling comprises information other than PDSCH scheduling information" comprises the following meaning: a DCI format carried by the first signaling is used to indicate a TCI state update.

In one embodiment, the technical feature that "a DCI format carried by the first signaling comprises information other than PDSCH scheduling information" comprises the following meaning: a DCI format carried by the first signaling is a DCI format having associated HARQ-ACK information but without scheduling a PDSCH.

In one embodiment, a PDSCH belonging to the reference serving cell and corresponding to the first signaling is an SPS PDSCH belonging to the reference serving cell and corresponding to the first signaling.

In one embodiment, a PDSCH belonging to the reference serving cell and corresponding to the first signaling is assumed to be a PDSCH belonging to the reference serving cell and scheduled by the first signaling.

In one embodiment, a PDSCH belonging to the reference serving cell and corresponding to the first signaling is a PDSCH belonging to the reference serving cell and scheduled as the first signaling.

In one embodiment, a PDSCH belonging to the reference serving cell and corresponding to the first signaling is treating the first signaling as an SPS PDSCH belonging to the reference serving cell.

In one embodiment, a PDSCH belonging to the reference serving cell and corresponding to the first signaling is a virtual PDSCH belonging to the reference serving cell.

In one embodiment, the technical feature that "a position of the target HARQ-ACK bit in the first HARQ bit block is the same as a position of a HARQ-ACK bit of a PDSCH belonging to the reference serving cell and corresponding to the first signaling in the first HARQ bit block" comprises the following meaning: a position of the target HARQ-ACK bit in the first HARQ bit block is a position of a corresponding HARQ-ACK bit in the first HARQ bit block when the first signaling is assumed to be a PDSCH belonging to the reference serving cell.

In one embodiment, the technical feature that "a position of the target HARQ-ACK bit in the first HARQ bit block is the same as a position of a HARQ-ACK bit of a PDSCH belonging to the reference serving cell corresponding to the first signaling in the first HARQ bit block" comprises the following meaning: a position of the target HARQ-ACK bit in the first HARQ bit block is a position of a corresponding HARQ-ACK bit in the first HARQ bit block when the first signaling is treated as an SPS PDSCH belonging to the reference serving cell.

In one embodiment, the technical feature that "a position of the target HARQ-ACK bit in the first HARQ bit block is the same as a position of a HARQ-ACK bit of a PDSCH belonging to the reference serving cell corresponding to the first signaling in the first HARQ bit block" comprises the following meaning: a position of the target HARQ-ACK bit in the first HARQ bit block is a position of a corresponding HARQ-ACK bit in the first HARQ bit block when the first signaling is treated as a PDSCH scheduled by the first signaling belonging to the reference serving cell.

In one embodiment, the technical feature that "a position of the target HARQ-ACK bit in the first HARQ bit block is the same as a position of a HARQ-ACK bit of a PDSCH belonging to the reference serving cell corresponding to the first signaling in the first HARQ bit block" comprises the following meaning: a position (or index) of a time-domain occasion occupied by the first signaling is determined based on a TDRA table for a PDSCH in the reference serving cell, and a position (or index) of a time-domain occasion occupied by the first signaling is used to determine a position of the target HARQ-ACK bit in the first HARQ bit block.

In one embodiment, the technical feature that "a position of the target HARQ-ACK bit in the first HARQ bit block is the same as a position of a HARQ-ACK bit of a PDSCH belonging to the reference serving cell corresponding to the first signaling in the first HARQ bit block" comprises the following meaning: a position (or index) of a time-domain occasion occupied by the first signaling is determined based on a row index corresponding to an SPS PDSCH in a time-domain resource assignment table in the serving cell, and a position (or index) of a time-domain occasion occupied by the first signaling is used to determine a position of the target HARQ-ACK bit in the first HARQ bit block.

In one embodiment, the technical feature that "a position of the target HARQ-ACK bit in the first HARQ bit block is the same as a position of a HARQ-ACK bit of a PDSCH belonging to the reference serving cell corresponding to the first signaling in the first HARQ bit block" comprises the following meaning: a position of the target HARQ-ACK bit in the first HARQ bit block is a position of a corresponding HARQ-ACK bit in the first HARQ bit block generated by adopting Type-1 HARQ-ACK codebook when the first signaling is treated as an SPS PDSCH belonging to the reference serving cell.

In one embodiment, the technical feature that "a position of the target HARQ-ACK bit in the first HARQ bit block is the same as a position of a HARQ-ACK bit of a PDSCH belonging to the reference serving cell corresponding to the first signaling in the first HARQ bit block" comprises the following meaning: a position of the target HARQ-ACK bit in the first HARQ bit block is a position of a HARQ-ACK bit in the first HARQ bit block determined by treating the first signaling as a virtual SPS PDSCH belonging to the reference serving cell and based on a row index in a time-domain resource assignment table corresponding to the virtual SPS PDSCH.

In one embodiment, the technical feature that "a position of the target HARQ-ACK bit in the first HARQ bit block is the same as a position of a HARQ-ACK bit of a PDSCH belonging to the reference serving cell corresponding to the first signaling in the first HARQ bit block" comprises the following meaning: a position of the target HARQ-ACK bit in the first HARQ bit block is a position of a HARQ-ACK bit in the first HARQ bit block determined by treating the first signaling as a virtual SPS PDSCH belonging to the reference serving cell and based on a row index in a time-domain resource assignment table corresponding to and the first delay value in the present application the virtual SPS PDSCH.

In one embodiment, the technical feature that "a position of the target HARQ-ACK bit in the first HARQ bit block is the same as a position of a HARQ-ACK bit of a PDSCH belonging to the reference serving cell corresponding to the first signaling in the first HARQ bit block" comprises the following meaning: a position of the target HARQ-ACK bit in the first HARQ bit block is a position of a HARQ-ACK bit in the first HARQ bit block determined by treating the first signaling as a virtual SPS PDSCH belonging to the reference serving cell and based on a number of slot(s) between the reference slot and the target slot and a row index in a time-domain resource assignment table corresponding to the virtual SPS PDSCH.

In one embodiment, the technical feature that "a position of the target HARQ-ACK bit in the first HARQ bit block is the same as a position of a HARQ-ACK bit of a PDSCH belonging to the reference serving cell corresponding to the first signaling in the first HARQ bit block" comprises the following meaning: a PDSCH belonging to the reference serving cell and corresponding to a first signaling is a virtual PDSCH, the first signaling is used to determine a delay value between the virtual PDSCH and a HARQ-ACK of the virtual PDSCH, a row index in a time-domain resource assignment table corresponding to the virtual PDSCH is a virtual index, and a position of the target HARQ-ACK bit in the first HARQ bit block is a position of a HARQ-ACK bit in the first HARQ bit block determined according to a delay value between the virtual PDSCH and a HARQ-ACK of the virtual PDSCH as well as the virtual index together.

Embodiment 7

Embodiment 7 illustrates a schematic diagram of a target delay set according to one embodiment of the present application, as shown in FIG. 7. In FIG. 7, each thick wireframe rectangle represents a delay set corresponding to a DCI format, DCI format #x represents a DCI format carried by a first signaling, and a delay set corresponding to DCI format #x is a target delay set.

In embodiment 7, a first delay value is equal to a number of slot(s) between the reference slot in the present application and the target slot in the present application, and the first delay value is an integer; the first delay value is a delay value comprised in a target delay set, the target delay set comprises at least one delay value, and any delay value comprised in the target delay set is an integer; a DCI format carried by the first signaling in the present application is used to determine the target delay set.

In one embodiment, the first delay value is equal to a number of slot(s) comprised in a time interval from a start time of the reference slot to a start time of the target slot.

In one embodiment, the first delay value is equal to a number of slot(s) comprised in a time interval from an end time of the reference slot to a start time of the target slot.

In one embodiment, the first delay value is equal to a number of slot(s) comprised in a time interval from an end time of the reference slot to an end time of the target slot.

In one embodiment, the first delay value can be equal to 0.

In one embodiment, the first delay value is greater than 0.

In one embodiment, the reference slot is not later than the target slot.

In one embodiment, the first delay value is equal to a difference value between an index of the target slot and an index of the reference slot.

In one embodiment, the first delay value is equal to a number of slot(s) corresponding to a same SCS with the reference slot and comprised in a time interval between the reference slot and the target slot.

In one embodiment, the first delay value is equal to a number of slot(s) of corresponding to an SCS of a subcarrier occupied by the first signal and comprised in a time interval between the reference slot and the target slot.

In one embodiment, the target delay set only comprises one delay value.

In one embodiment, the target delay set comprises multiple delay values.

In one embodiment, any delay value comprised in the target delay set is a possible value of kl.

In one embodiment, any delay value comprised in the target delay set is a possible number of slot(s) between a Physical Downlink Shared Channel (PDSCH) and a corresponding HARQ-ACK.

In one embodiment, any delay value comprised in the target delay set is a possible number of slot(s) between a PDCCH and an associated HARQ-ACK.

In one embodiment, any delay value comprised in the target delay set is a possible number of slot(s) between a semi-persistent scheduling (SPS) PDSCH release and an associated HARQ-ACK.

In one embodiment, the target delay set is a timing list from a PDSCH to a DL ACK.

In one embodiment, the target delay set is a positive sequence of a timing interval from a PDSCH to a DL ACK.

In one embodiment, the target delay set is delay set of {1,2,3,4,5,6,7,8}.

In one embodiment, the target delay set is configured or pre-defined.

In one embodiment, the target delay set is an integer sequence indicated by a field or IE "dl DataToUL ACK", or the target delay set is an integer sequence indicated by a field or IE "dl DataToUL ACK r16", or the target delay set is an integer sequence indicated by a field or IE "dl DataToUL ACK DCI-1-2", or the target delay set is an integer sequence indicated by a field or IE "dl DataToUL ACK DCI-1-2 r17", or the target delay set is an integer sequence indicated by a field or IE "dl DataToUL ACK r17", or the target delay set is an integer sequence indicated by a field or IE "dl DataToUL ACK r18", or the target delay set is an integer sequence indicated by a field or IE "dl DataToUL ACK v1700", or the target delay set is an integer sequence indicated by a field or IE "dl DataToUL ACK MulticastDCI-Format4-1-r17".

In one embodiment, the target delay set is an integer sequence indicated by a field or IE "dl-DataToUL-ACK-DCI-1-Φ-r18", where "DCI-1-Φ" corresponds DCI format 1_Φ. In one subsidiary embodiment of the above embodiment, Φ is equal to 3. In one subsidiary embodiment of the above embodiment, Φ is equal to 4. In one subsidiary embodiment of the above embodiment, Φ is equal to 5. In one subsidiary embodiment of the above embodiment, Φ represents a letter.

In one embodiment, any delay value comprised in the target delay set is a possible value that can be indicated by a PDSCH-to-HARQ_feedback timing indicator.

In one embodiment, any delay value comprised in the target delay set is not greater than 15.

In one embodiment, any delay value comprised in the target delay set is not greater than 31.

In one embodiment, any delay value comprised in the target delay set is not greater than 127.

In one embodiment, any delay value comprised in the target delay set is not less than 0.

In one embodiment, at least one delay value comprised in the target delay set is less than 0.

In one embodiment, any delay value comprised in the target delay set is greater than 0.

In one embodiment, a delay value comprised in the target delay set is equal to 0.

In one embodiment, the technical feature that "a DCI format carried by the first signaling is used to determine the target delay set" comprises the following meaning: a DCI format carried by the first signaling is used by the first node in the present application to determine the target delay set.

In one embodiment, the technical features that "a DCI format carried by the first signaling is used to determine the target delay set" and "a number of serving cell(s) configured by a higher-layer signaling or a higher-layer parameter of the first signaling is used to determine the target delay set" are equivalent or interchangeable.

In one embodiment, the technical feature that "a DCI format carried by the first signaling is used to determine the target delay set" comprises the following meaning: a DCI format carried by the first signaling is used to determine the target delay set from multiple candidate delay sets. In one subsidiary embodiment of the above embodiment, any of the multiple candidate delay sets comprises at least one delay value. In one subsidiary embodiment of the above embodiment, any of the multiple candidate delay sets is configured or predefined.

In one embodiment, the technical feature that "a DCI format carried by the first signaling is used to determine the target delay set" comprises the following meaning: the target delay set is a candidate delay set corresponding to a DCI format carried by the first signaling among multiple candidate delay sets. In one subsidiary embodiment of the above embodiment, any of the multiple candidate delay sets comprises at least one delay value. In one subsidiary embodiment of the above embodiment, any of the multiple candidate delay sets is configured or predefined.

In one embodiment, the technical feature that "a DCI format carried by the first signaling is used to determine the target delay set" comprises the following meaning: the target delay set is a candidate delay set adopted by a DCI format carried by the first signaling among multiple candidate delay sets. In one subsidiary embodiment of the above embodiment, any of the multiple candidate delay sets comprises at least one delay value. In one subsidiary embodiment of the above embodiment, any of the multiple candidate delay sets is configured or predefined.

In one embodiment, the technical feature that "a DCI format carried by the first signaling is used to determine the target delay set" comprises the following meaning: a DCI format carried by the first signaling, which supports simultaneously releasing SPS PDSCHs belonging to multiple serving cells, is used to determine the target delay set.

In one embodiment, the technical feature that "a DCI format carried by the first signaling is used to determine the target delay set" comprises the following meaning: a DCI format carried by the first signaling, which supports simultaneously indicating dormancy of multiple serving cells, is used to determine the target delay set.

In one embodiment, the technical feature that "a DCI format carried by the first signaling is used to determine the target delay set" comprises the following meaning: a DCI format carried by the first signaling, which supports simultaneously indicating TCI update of multiple serving cells, is used to determine the target delay set.

In one embodiment, the technical feature that "a DCI format carried by the first signaling is used to determine the target delay set" comprises the following meaning: when a DCI format carried by the first signaling is a DCI format, the target delay set is one of multiple candidate delay sets; when a DCI format carried by the first signaling is another DCI format, the target delay set is another one of multiple candidate delay sets.

In one embodiment, the technical feature that "a DCI format carried by the first signaling is used to determine the target delay set" comprises the following meaning: when a DCI format carried by the first signaling is DCI format 1_(1), the target delay set is one of multiple candidate delay sets; otherwise, the target delay set is another delay set in the multiple candidate delay sets; herein, the is a positive integer greater than 2 or $\Phi$ represents a letter. In one subsidiary embodiment of the above embodiment, is equal to 3. In one subsidiary embodiment of the above embodiment, $\Phi$ is equal to 4. In one subsidiary embodiment of the above embodiment, $\Phi$ is equal to 5. In one subsidiary embodiment of the above embodiment, any of the multiple candidate delay sets comprises at least one delay value. In one subsidiary embodiment of the above embodiment, any of the multiple candidate delay sets is configured or predefined.

In one embodiment, the technical feature that "a DCI format carried by the first signaling is used to determine the target delay set" comprises the following meaning: a DCI format carried by the first signaling being DCI format 1_ $\Phi$ is used to determine the target delay set, where $\Phi$ is a positive integer greater than 2 or the $\Phi$ represents a letter. In one subsidiary embodiment of the above embodiment, $\Phi$ is equal to 3. In one subsidiary embodiment of the above embodiment, is equal to 4. In one subsidiary embodiment of the above embodiment, is equal to 5.

In one embodiment, when the target delay set comprises multiple delay values, the first signaling is used to determine a number of slot(s) between the reference slot and the target slot from the target delay set; when the target delay set only comprises one delay value, a number of slot(s) between the reference slot and the target slot is equal to only one delay value comprised in the target delay set.

Embodiment 8

Embodiment 8 illustrates a schematic diagram of a first threshold according to one embodiment of the present application, as shown in FIG. 8. In FIG. 8, the horizontal axis represents time, and a time interval between a first signal and a first signaling in time domain is not less than a first threshold.

In embodiment 8, the first signal in the present application is later than the first signaling in the present application in time domain, and a number of time-domain symbol(s) between the first signal and the first signaling in time domain is not less than a first threshold, and the first threshold is greater than 0; a first index value is equal to an index value of an SCS of a subcarrier occupied by the first signaling in frequency domain, a second index value is equal to an index value of an SCS of a subcarrier occupied by the first signal in frequency domain, and a smaller one of the first index value and the second index value is used to determine the first threshold.

In one embodiment, the technical feature that "the first signal is later than the first signaling in time domain" comprises the following meaning: a start time of the first signal in time domain is later than a start time of the first signaling in time domain.

In one embodiment, the technical feature that "the first signal is later than the first signaling in time domain" comprises the following meaning: a start time of the first signal in time domain is later than an end time of the first signaling in time domain.

In one embodiment, the technical feature that "the first signal is later than the first signaling in time domain" comprises the following meaning: an end time of the first signal in time domain is later than a start time of the first signaling in time domain.

In one embodiment, the technical feature that "the first signal is later than the first signaling in time domain" comprises the following meaning: an end time of the first signal in time domain is later than an end time of the first signaling in time domain.

In one embodiment, a number of time-domain symbol(s) between the first signal and the first signaling in time domain is equal to a number of time-domain symbol(s) between an earliest time-domain symbol occupied by the first signal and a latest time-domain symbol occupied by the first signaling.

In one embodiment, a number of time-domain symbol(s) between the first signal and the first signaling in time domain is equal to a number of time-domain symbol(s) of the first signal after a latest time-domain symbol occupied by the first signaling.

In one embodiment, a number of time-domain symbol(s) between the first signal and the first signaling in time domain is equal to a number of time-domain symbol(s) of the first signal later than a latest time-domain symbol occupied by the first signaling.

In one embodiment, a number of time-domain symbol(s) between the first signal and the first signaling in time domain is equal to a number of time-domain symbol(s) corresponding to an SCS of a subcarrier occupied by the first signal in frequency domain and between the first signal and the first signaling in time domain.

In one embodiment, a number of time-domain symbol(s) between the first signal and the first signaling in time domain is equal to a number of time-domain symbol(s) corresponding to an SCS of a subcarrier occupied by the first signaling in frequency domain and between the first signal and the first signaling in time domain.

In one embodiment, a number of time-domain symbol(s) between the first signal and the first signaling in time domain is equal to a number of time-domain symbol(s) corresponding to an SCS indexed by a smaller value compared between the first index value or the second index value and between the first signal and the first signaling in time domain.

In one embodiment, the first threshold is a positive integer.

In one embodiment, the first threshold can be a non-integer number.

In one embodiment, the first threshold is equal to one of 5, 5.5 and 11.

In one embodiment, the first threshold is equal to one of 10, 12, 22, 25, 100 and 200.

In one embodiment, the first receiver receives a second information block; herein, the first threshold is a candidate threshold in a first candidate threshold set or a second candidate threshold set, the first candidate threshold set comprises at least one pre-defined candidate threshold, and the second candidate threshold set comprises at least one pre-defined candidate threshold; the second information block is used to determine a candidate threshold set to which the first threshold belongs from the first candidate threshold set or the second candidate threshold set. In one subsidiary embodiment of the above embodiment, the second information block and the first information block respectively belong to two different fields in a same IE. In one subsidiary embodiment of the above embodiment, the second information block and the first information block respectively belong to two different IEs. In one subsidiary embodiment of the above embodiment, the first candidate threshold set comprises 5, 5.5 and 11, and the second candidate threshold set comprises 10, 12, 22, 25, 100 and 200. In one subsidiary embodiment of the above embodiment, the second information block is also used to determine a candidate index value set of an SCS to which the first index value and the second index value belong together.

In one embodiment, the technical feature that "a number of time-domain symbol(s) between the first signal and the first signaling in time domain is not less than a first threshold" comprises the following meaning: the first signal is transmitted at least N1 time-domain symbols later than the first signaling, where N1 represents the first threshold.

In one embodiment, the technical feature that "a number of time-domain symbol(s) between the first signal and the first signaling in time domain is not less than a first threshold" comprises the following meaning: the first signal is transmitted after N1 time-domain symbols after a latest time-domain symbol of the first signaling, where N1 represents the first threshold.

In one embodiment, the technical feature that "a number of time-domain symbol(s) between the first signal and the first signaling in time domain is not less than a first threshold" comprises the following meaning: the first node expects that a number of time-domain symbol(s) between the first signal and the first signaling in time domain is not less than the first threshold.

In one embodiment, the first index value is a non-negative integer.

In one embodiment, the first index value is equal to one of 0, 1 and 2.

In one embodiment, the first index value is equal to one of 0, 1, 2, 3, 5 and 6.

In one embodiment, the first index value increases the index based on an ascending order of SCS.

In one embodiment, the second index value is a non-negative integer.

In one embodiment, the second index value is equal to one of 0, 1 and 2.

In one embodiment, the second index value is equal to one of 0, 1, 2, 3, 5 and 6.

In one embodiment, the second index value increases the index based on an ascending order of SCS.

In one embodiment, the first threshold is equal to one of 5, 5.5 and 11, the first index value is equal to one of 0, 1, and 2, and the second index value is equal to one of 0, 1 and 2.

In one embodiment, the first threshold is equal to one of 10, 12, 22, 25, 100 and 200, the first index value is equal to one of 0, 1, 2, 3, 5, and 6, and the second index value is equal to one of 0, 1, 2, 3, 5, and 6.

In one embodiment, SCSs of any two subcarriers occupied by the first signaling in frequency domain are equal.

In one embodiment, SCSs of any two subcarriers occupied by the first signal in frequency domain are equal.

In one embodiment, the first index value is greater than the second index value.

In one embodiment, the first index value is less than the second index value.

In one embodiment, the first index value is equal to the second index value.

In one embodiment, the technical feature that "a smaller value compared between the first index value or the second index value is used to determine the first threshold" comprises the following meaning: a smaller value compared between the first index value or the second index value is used by the first node in the present application to determine the first threshold.

In one embodiment, the technical feature that "a smaller value compared between the first index value or the second index value is used to determine the first threshold" comprises the following meaning: a smaller value compared between the first index value or the second index value is used to determine the first threshold according to a pre-defined mapping relation or a corresponding relation.

In one embodiment, the technical feature that "a smaller value compared between the first index value or the second index value is used to determine the first threshold" comprises the following meaning: a smaller value compared between the first index value or the second index value is used to determine the first threshold according to a pre-defined operation relation or operation formula.

In one embodiment, the technical feature that "a smaller value compared between the first index value or the second index value is used to determine the first threshold" comprises the following meaning: the first index value is one of Q1 candidate index values, the second index value is one of the Q1 candidate index values, any of the Q1 candidate index values is a non-negative integer, Q1 being a positive integer greater than 1; the Q1 candidate index values respectively correspond to Q1 candidate thresholds, and any of the Q1 candidate thresholds is greater than 0; the first threshold is equal to a candidate threshold corresponding to a smaller value compared between the first index value or the second index value among the Q1 candidate thresholds. In one subsidiary embodiment of the above embodiment, the Q1 candidate index values and the Q1 candidate thresholds are pre-defined. In one subsidiary embodiment of the above embodiment, the Q1 candidate index values and the Q1 candidate thresholds are configurable. In one subsidiary embodiment of the above embodiment, one-to-one corresponding relation between the Q1 candidate index values and the Q1 candidate thresholds is pre-defined or configurable. In one subsidiary embodiment of the above embodiment, an information block other than the first information block is used to explicitly or implicitly indicate the Q1 candidate thresholds. In one subsidiary embodiment of the above embodiment, part or all of the first information block is used to explicitly or implicitly indicate the Q1 candidate thresholds. In one subsidiary embodiment of the above embodiment, the Q1 candidate thresholds is related to at least one capacity parameter of the first node. In one subsidiary embodiment of the above embodiment, the Q1 candidate index values are related to a frequency range (FR) to which frequency-domain resources occupied by the first signal belong.

Embodiment 9

Embodiment 9 illustrates a schematic diagram of a first field according to one embodiment of the present application, as shown in FIG. 9. In FIG. 9, each area with an arc top on the above represents a serving cell in a first cell set, the slash-filled area with an arc top represents a first serving cell, the long thick wireframe rectangle below represents a first DCI format, each gray-filled short rectangle in the thick box represents a field in a first DCI format, and the field set to '1111' represents a first field.

In embodiment 9, the first signaling in the present application carries a first DCI format, and a first field is a field comprised in the first DCI format, and the first field comprised in the first signaling is set to a predefined value; a size of the first DCI format is related to a number of serving cells comprised in the first cell set in the present application; a position of the first field in the first DCI format is used to determine a first serving cell from the first cell set, and the first DCI format is used for the first serving cell.

In one embodiment, the first cell set is a cell set comprising most serving cells among multiple cell sets.

In one embodiment, the first DCI format is one of 0_2 or 1_2, or the first DCI format is one of 0_K or 1_K, or the first DCI format is one of 0_2, 0_K, 1_2 and 1_K, or the first DCI format is one of 0_1, 0_2, 0_K, 1_1, 1_2 and 1_K, or the first DCI format is one of 0_1, 0_2, 1_1 and 1_2; or the first DCI format is one of 0_0, 0_1, 1_0 and 1_1; or the first DCI format is one of 0_0 and 1_0; or the first DCI format is one of 0_0, 0_1, 0_2, 1_0, 1_1 and 1_2; or the first DCI format is one of 0_0, 0_1, 0_2, 0_K, 1_0, 1_1, 1_2, and 1_K; where K is a positive integer greater than 2. In one subsidiary embodiment of the above embodiment, K is equal to 3. In one subsidiary embodiment of the above embodiment, K is equal to 4. In one subsidiary embodiment of the above embodiment, K is equal to 5.

In one embodiment, a DCI format group to which the first DCI format belongs is pre-defined or configured.

In one embodiment, a DCI format group to which the first DCI format belongs is configured through a PDCCH configuration signaling.

In one embodiment, a DCI format group to which the first DCI format belongs is configured through a configuration signaling of the first search space.

In one embodiment, the first DCI format is a DCI format scheduling a downlink channel or signal.

In one embodiment, the first DCI format is one of DCI formats supported by a UE-Specific Search Set (USS set).

In one embodiment, the first DCI format is DCI format 1_3, or the first DCI format is DCI format 1_ 4, or the first DCI format is DCI format 1_5, or the first DCI format is DCI format 1_1a, or the first DCI format is DCI format 1_ 2a.

In one embodiment, a payload comprised in the first DCI format is transmitted through the first signaling.

In one embodiment, an information bit comprised in the first DCI format is transmitted through the first signaling.

In one embodiment, the first DCI format is used to generate the first signaling.

In one embodiment, the first signaling carries all or partial fields in the first DCI format.

In one embodiment, all or part of fields comprised in the first DCI format are subjected to one or multiple of DCI size alignment, CRC attachment, channel coding, rate matching, scrambling, PDCCH modulation, mapping to physical resources, OFDM baseband signal generation as well as modulation and upconversion to generate the first signaling.

In one embodiment, the first field is a given field comprised in the first DCI format.

In one embodiment, the first field is a pre-defined field comprised in the first DCI format.

In one embodiment, the first field is a redundancy version (RV) field.

In one embodiment, the first field is a modulation and coding scheme (MCS) field.

In one embodiment, the first field is a frequency-domain resource assignment (FDRA) field.

In one embodiment, the first field is a HARQ process number field.

In one embodiment, the technical feature that "the first field comprised in the first signaling is set as a predefined value" comprises the following meaning: all bits in the first field comprised in the first signaling are set as all "0".

In one embodiment, the technical feature that "the first field comprised in the first signaling is set as a predefined value" comprises the following meaning: all bits in the first field comprised in the first signaling are set as all "1".

In one embodiment, the technical feature that "the first field comprised in the first signaling is set as a predefined value" comprises the following meaning: partial bits in the first field comprised in the first signaling are set as all "1" and other bits are set as all "0".

In one embodiment, a size of the first DCI format is equal to a payload size of the first DCI format.

In one embodiment, a size of the first DCI format is equal to a number of bit(s) comprised in the first DCI format.

In one embodiment, a size of the first DCI format is equal to a number of payload bit(s) comprised in the first DCI format.

In one embodiment, a size of the first DCI format is equal to a total number of bits of payload bit(s) and CRC bit(s) comprised in the first DCI format.

In one embodiment, a size of the first DCI format is equal to a number of information bit(s) comprised in the first DCI format.

In one embodiment, a size of the first DCI format is equal to a total number of bits of information bit(s) and CRC bit(s) comprised in the first DCI format.

In one embodiment, a size of the first DCI format is equal to a size of the first DCI format not through the size alignment.

In one embodiment, a size of the first DCI format is equal to a size of the first DCI format before size alignment of uplink and downlink scheduling a DCI format.

In one embodiment, a size of the first DCI format is equal to a size of the first DCI format not through padding.

In one embodiment, a size of the first DCI format is equal to a size of the first DCI format acquired through the size alignment.

In one embodiment, a size of the first DCI format is equal to a size of the first DCI format after size alignment of uplink and downlink scheduling a DCI format.

In one embodiment, a size of the first DCI format is equal to a size of the first DCI format through padding.

In one embodiment, a size of the first DCI format is an assumed size when a PDCCH candidate is monitored for the first DCI format.

In one embodiment, a size of the first DCI format is an assumed size when a PDCCH assumed to carry the first DCI format is decoded.

In one embodiment, the technical feature that "a size of the first DCI format is related to a number of serving cells comprised in the first cell set" comprises the following meaning: a number of serving cell(s) comprised in the first cell set is used to determine a size of the first DCI format.

In one embodiment, the technical feature that "a size of the first DCI format is related to a number of serving cells comprised in the first cell set" comprises the following meaning: a number of bit(s) comprised in at least one field comprised in the first DCI format is related to a number of serving cell(s) comprised in the first cell set.

In one embodiment, the technical feature that "a size of the first DCI format is related to a number of serving cells comprised in the first cell set" comprises the following meaning: at least one of a number of bit(s) comprised in at least one field comprised in the first DCI format or a number of field(s) with a same type comprised in the first DCI format is related to a number of serving cell(s) comprised in the first cell set.

In one embodiment, the technical feature that "a size of the first DCI format is related to a number of serving cells comprised in the first cell set" comprises the following meaning: a bit width of at least one field comprised in the first DCI format is related to a number of serving cell(s) comprised in the first cell set.

In one embodiment, the technical feature that "a size of the first DCI format is related to a number of serving cells comprised in the first cell set" comprises the following meaning: at least one of a number of bit(s) comprised in at least one field comprised in the first DCI format or a number of field(s) comprised in the first DCI format is linearly correlated to a number of serving cell(s) comprised in the first cell set.

In one embodiment, the technical feature that "a size of the first DCI format is related to a number of serving cells comprised in the first cell set" comprises the following meaning: a number of serving cell(s) comprised in the first cell set is used to determine at least one of a number of bit(s) comprised in at least one field comprised in the first DCI format or a number of field(s) comprised in the first DCI format according to condition relation or mapping rule.

In one embodiment, the technical feature that "a size of the first DCI format is related to a number of serving cells comprised in the first cell set" comprises the following meaning: a number of serving cell(s) comprised in the first cell set is used to calculate at least one of a number of bit(s) comprised in at least one field comprised in the first DCI format or a number of field(s) comprised in the first DCI format.

In one embodiment, the technical feature that "a size of the first DCI format is related to a number of serving cells comprised in the first cell set" comprises the following meaning: a number of bit(s) comprised in at least one field comprised in the first DCI format is linearly correlated with a rounded up value of a logarithmic value of a number of serving cell(s) with a base of 2.

In one embodiment, the technical feature that "a size of the first DCI format is related to a number of serving cells comprised in the first cell set" comprises the following meaning: a number of field(s) comprised in the first DCI format is linearly correlated with a rounded up value of a logarithmic value of a number of serving cell(s) comprised in the first cell set with a base of 2.

In one embodiment, the technical feature that "a size of the first DCI format is related to a number of serving cells comprised in the first cell set" comprises the following meaning: a number of bit(s) comprised in at least one field comprised in the first DCI format is linearly correlated with a rounded up value of a logarithmic value of a number of serving cell(s) comprised in the first cell set with a base of 2, and a number of field(s) comprised in the first DCI format is linearly correlated to a number of serving cell(s) comprised in the first cell set.

In one embodiment, a number of bit(s) comprised in a field comprised in the first DCI format is equal to a bit width of the field.

In one embodiment, at least one of a number of bit(s) comprised in an RV field comprised the first DCI format, a number of bit(s) comprised in the New Data Indicator (NDI) field, a number of bit(s) comprised in a HARQ process number field or a number of bit(s) comprised in the Modulation and Coding Scheme (MCS) field is related to a number of serving cell(s) comprised in the first cell set.

In one embodiment, a number of bit(s) comprised in at least one field in a frequency-domain resource assignment field, a time-domain resource assignment field, a Physical Uplink Control Channel (PUCCH) resource indication field, a PDSCH to HARQ feedback timing indication field, an antenna port field or a TCI field comprised in the first DCI format is related to a number of serving cell(s) comprised in the first cell set.

In one embodiment, a total number of fields comprised in the first DCI format is related to a number of serving cell(s) comprised in the first cell set.

In one embodiment, a total number of fields comprised in the first DCI format is linearly correlated to a number of serving cell(s) comprised in the first cell set.

In one embodiment, a total number of field(s) with a same type comprised in the first DCI format is related to a number of serving cell(s) comprised in the first cell set, the same type refers to a combination of one or more of an NDI, a HARQ process number, an RV, an MCS, a frequency-domain resource assignment, a time-domain resource assignment, a PUCCH resource indication, a PDSCH to HARQ feedback timing indication, an antenna port, and a TCI.

In one embodiment, the first serving cell is a serving cell comprised in the first cell set.

In one embodiment, the first serving cell belongs to the first cell set.

In one embodiment, a serving cell set for which the first DCI format is used only comprises the first serving cell.

In one embodiment, the first DCI format is also used for a serving cell other than the first serving cell.

In one embodiment, the technical feature that "the first DCI format is used for the first serving cell" comprises the following meaning: the first DCI format is used to schedule the first serving cell.

In one embodiment, the technical feature that "the first DCI format is used for the first serving cell" comprises the following meaning: the first DCI format is used to activate the first serving cell.

In one embodiment, the technical feature that "the first DCI format is used for the first serving cell" comprises the following meaning: the first DCI format is used to release an SPS PDSCH on the first serving cell.

In one embodiment, the technical feature that "the first DCI format is used for the first serving cell" comprises the following meaning: the first DCI format is used to explicitly or implicitly activate an SPS PDSCH on the first serving cell.

In one embodiment, the technical feature that "the first DCI format is used for the first serving cell" comprises the following meaning: the first DCI format is used to explicitly or implicitly indicate a dormancy of the first serving cell.

In one embodiment, the technical feature that "the first DCI format is used for the first serving cell" comprises the following meaning: the first DCI format is used to explicitly or implicitly indicate a TCI state update of the first serving cell.

In one embodiment, the technical feature that "the first DCI format is used for the first serving cell" comprises the following meaning: the first DCI format corresponds to or is associated with the first serving cell.

In one embodiment, the technical feature that "the first DCI format is used for the first serving cell" comprises the following meaning: a serving cell set to which the first DCI format corresponds or with which the first DCI format is associated comprises the first serving cell.

In one embodiment, the technical feature that "the first DCI format is used for the first serving cell" comprises the following meaning: the first serving cell belongs to the first cell set.

In one embodiment, a position of the first field in the first DCI format refers to an order of the first field in all fields comprised in the first DCI format.

In one embodiment, a position of the first field in the first DCI format refers to an order of the first field in partial fields comprised in the first DCI format.

In one embodiment, a position of the first field in the first DCI format refers to an order of the first field in fields with a same type comprised in the first DCI format.

In one embodiment, a position of the first field in the first DCI format refers to an index or order of at least one bit comprised in the first field in information bit(s) comprised in the first DCI format.

In one embodiment, the first DCI format comprises W1 fields, W1 being a positive integer greater than 1, and any two of the W1 fields are fields with a same type, and the first field is one of the W1 fields; a position of the first field in the first DCI format is an index or order of the first field in the W1 fields. In one subsidiary embodiment of the above embodiment, a type of any of the W1 fields is an RV field. In one subsidiary embodiment of the above embodiment, a type of any of the W1 fields is a modulation coding scheme field. In one subsidiary embodiment of the above embodiment, a type of any of the W1 fields is a frequency-domain resource assignment field. In one subsidiary embodiment of the above embodiment, a type of any of the W1 fields is a HARQ process number field.

In one embodiment, the first DCI format comprises W1 fields, W1 being a positive integer greater than 1, and any two of the W1 fields are fields with a same type, the first field is one of the W1 fields, and the W1 fields are arranged in order; a position of the first field in the first DCI format refers to an index or order of the first field in the W1 fields. In one subsidiary embodiment of the above embodiment, a type of any of the W1 fields is an RV field. In one subsidiary embodiment of the above embodiment, a type of any of the W1 fields is a modulation coding scheme field. In one subsidiary embodiment of the above embodiment, a type of any of the W1 fields is a frequency-domain resource assignment field. In one subsidiary embodiment of the above embodiment, a type of any of the W1 fields is a HARQ process number field.

In one embodiment, the first DCI format comprises a target field, the target field comprises W2 sub-fields, W2 being a positive integer greater than 1, and the first field is one of the W2 subfields; a position of the first field in the first DCI format is an index or order of the first field in the W2 subfields. In one subsidiary embodiment of the above embodiment, the target field is an RV field. In one subsidiary embodiment of the above embodiment, the target field is an MCS field. In one subsidiary embodiment of the above embodiment, the target field is a frequency-domain resource assignment field. In one subsidiary embodiment of the above embodiment, the target field is a HARQ process number field.

In one embodiment, the first DCI format comprises a target field, the target field comprises W2 sub-fields arranged in order, W2 being a positive integer greater than 1, and the first field is one of the W2 subfields arranged in order; a position of the first field in the first DCI format refers to an index or order of the first field in the W2 subfields arranged in order. In one subsidiary embodiment of the above embodiment, the target field is an RV field. In one subsidiary embodiment of the above embodiment, the target field is an MCS field. In one subsidiary embodiment of the above embodiment, the target field is a frequency-domain resource assignment field. In one subsidiary embodiment of the above embodiment, the target field is a HARQ process number field.

In one embodiment, the technical feature that "a position of the first field in the first DCI format is used to determine a first serving cell from the first cell set" comprises the following meaning: a position of the first field in the first DCI format is used by the first node in the present application to determine the first serving cell from the first cell set.

In one embodiment, the technical feature that "a position of the first field in the first DCI format is used to determine a first serving cell from the first cell set" comprises the following meaning: a position of the first field in the first DCI format is used to determine the first serving cell from the first cell set according to a corresponding relation or a mapping relation.

In one embodiment, the technical feature that "a position of the first field in the first DCI format is used to determine a first serving cell from the first cell set" comprises the following meaning: a position of the first field in the first DCI format is one of W1 candidate positions, W1 being a positive integer greater than 1; the W1 candidate positions respectively correspond to W1 serving cells in the first cell set, and the first serving cell is a serving cell corresponding to a position of the first field in the first DCI format among the W1 serving cells.

In one embodiment, the technical feature that "a position of the first field in the first DCI format is used to determine a first serving cell from the first cell set" comprises the following meaning: the first field is one of W1 fields comprised in the first DCI format, and any two of the W1 fields are of a same type, W1 being a positive integer greater than 1, and the W1 is not greater than a number of serving cell(s) comprised in the first cell set; the W1 fields respectively correspond to W1 serving cells in the first cell set, and the first serving cell is a serving cell corresponding to the first field among the W1 serving cells.

In one embodiment, the technical feature that "a position of the first field in the first DCI format is used to determine a first serving cell from the first cell set" comprises the following meaning: the first DCI format comprises a target field, the target field comprises W2 sub-fields, W2 being a positive integer greater than 1, W2 is not greater than a number of serving cell(s) comprised in the first cell set, and the first field is one of the W2 sub-fields; the W2 sub-fields respectively correspond to W2 serving cells in the first cell set, and the first serving cell is a serving cell corresponding to the first field among the W2 serving cells.

In one embodiment, the technical feature that "a position of the first field in the first DCI format is used to determine a first serving cell from the first cell set" comprises the following meaning: the first field is one of the W1 fields comprised in the first DCI format, and any two fields in the W1 fields are of a same type, W1 being a positive integer greater than 1, and the W1 is not greater than a number of serving cell(s) comprised in the first cell set; the W1 fields respectively correspond to W1 serving cells in the first cell set, the W1 fields are indexed in order, an ascending order of indexes of the W1 fields respectively correspond to an ascending order of indexes of serving cells of the W1 serving cells; the first serving cell is a serving cell corresponding to the first field among the W1 serving cells.

In one embodiment, the technical feature that "a position of the first field in the first DCI format is used to determine a first serving cell from the first cell set" comprises the following meaning: the first field is one of the W1 fields comprised in the first DCI format, and any two of the W1 fields are of a same type, W1 being a positive integer greater than 1, and the W1 is not greater than a number of serving cell(s) comprised in the first cell set; the W1 fields respectively correspond to W1 serving cells in the first cell set, the W1 fields are indexed in order, a descending order of indexes of the W1 fields respectively correspond to an ascending order of indexes of serving cells of the W1 serving cells; the first serving cell is a serving cell corresponding to the first field among the W1 serving cells.

Embodiment 10

Embodiment 10 illustrates a schematic diagram of a row index in a time-domain resource assignment table according to one embodiment of the present application, as shown in FIG. 10. The table in FIG. 10 is a time-domain resource assignment table, the first column on the left represents row index, "a1, a2, a3, a4, a5, a6, a7, a8" in the second column on the left represents a slot offset value, the third column on the left represents a resource mapping type, and "b1, b2, b3, b4, b5, b6, b7, b8" in the fourth column on the left represents a value indicated by a start length.

In embodiment 10, a serving cell to which the first signaling in the present application belongs and a time-domain occasion occupied by the first signaling in a serving cell to which it belongs are used to determine a position of the target HARQ-ACK bit in the present application in the first HARQ bit block in the present application, and a row index in a time-domain resource assignment table belonging to the reference serving cell in the present application is used to determine a time-domain occasion occupied by the first signaling in a serving cell to which it belongs.

In one embodiment, a serving cell to which the first signaling belongs is a serving cell transmitting the first signaling.

In one embodiment, a serving cell to which the first signaling belongs is a serving cell corresponding to a carrier to which frequency-domain resources occupied by the first signaling belong.

In one embodiment, a serving cell to which the first signaling belongs is a serving cell to which a bandwidth part (BWP) to which frequency-domain resources occupied by the first signaling belong belongs.

In one embodiment, a serving cell to which the first signaling belongs is a serving cell indicated by a synchronization signal referenced when the first signaling is received.

In one embodiment, a serving cell to which the first signaling belongs is a serving cell indicated by a synchronization broadcast signal used for a reception timing of the first signaling.

In one embodiment, a serving cell to which the first signaling belongs is a serving cell indicated by a synchronization broadcast signal used for time synchronization and frequency synchronization of the first signaling.

In one embodiment, a time-domain occasion occupied by a serving cell to which the first signaling belongs is the first time-domain occasion in the present application.

In one embodiment, a time-domain occasion occupied by the first signaling in a serving cell to which it belongs is a time-domain occasion comprising time-domain resources occupied by the first signaling in a serving cell to which it belongs.

In one embodiment, a time-domain occasion occupied by the first signaling in a serving cell to which it belongs is a time-domain symbol set comprising time-domain symbol(s) occupied by the first signaling in a serving cell to which belongs.

In one embodiment, a time-domain occasion occupied by the first signaling in a serving cell to which it belongs is continuous time-domain resource sets comprising time-domain symbol(s) occupied by the first signaling in a serving cell to which belongs.

In one embodiment, a time-domain occasion occupied by the first signaling in a serving cell to which it belongs corresponds to an SCS of a subcarrier occupied by the first signaling in frequency domain.

In one embodiment, a time-domain occasion occupied by the first signaling in a serving cell to which it belongs is a PDSCH reception occasion.

In one embodiment, a time-domain occasion occupied by the first signaling in a serving cell to which it belongs is an SPS PDSCH release occasion.

In one embodiment, a time-domain occasion occupied by the first signaling in a serving cell to which it belongs is a TCI state update occasion.

In one embodiment, the technical feature "a serving cell to which the first signaling belongs and a time-domain occasion occupied by the first signaling in a serving cell to which it belongs are used to determine a position of the target HARQ-ACK bit in the first HARQ bit block" comprises the following meaning: a serving cell to which the first signaling belongs and a time-domain occasion occupied by the first signaling in a serving cell to which it belongs are used by the first node in the present application to determine a position of the target HARQ-ACK bit in the first HARQ bit block In one embodiment, the technical feature "a serving cell to which the first signaling belongs and a time-domain occasion occupied by the first signaling in a serving cell to which it belongs are used to determine a position of the target HARQ-ACK bit in the first HARQ bit block" comprises the following meaning: a position of the target HARQ-ACK bit in the first HARQ bit block is associated with or corresponds to a serving cell to which the first signaling belongs and a time-domain occasion occupied by the first signaling in a serving cell to which it belongs.

In one embodiment, the technical feature "a serving cell to which the first signaling belongs and a time-domain occasion occupied by the first signaling in a serving cell to which it belongs are used to determine a position of the target HARQ-ACK bit in the first HARQ bit block" comprises the following meaning: a serving cell to which the first signaling belongs and a time-domain occasion occupied by the first signaling in a serving cell to which it belongs are used to determine an index or order of the target HARQ-ACK bit in the first HARQ bit block In one embodiment, the technical feature "a serving cell to which the first signaling belongs and a time-domain occasion occupied by the first signaling in a serving cell to which it belongs are used to determine a position of the target HARQ-ACK bit in the first HARQ bit block" comprises the following meaning: an index of the target HARQ-ACK bit in the first HARQ bit block is linearly correlated with an index of a serving cell to which the first signaling belongs, and an index of the target HARQ-ACK bit in the first HARQ bit block is linearly correlated with an index of a time-domain occasion occupied by the first signaling in a serving cell to which it belongs.

In one embodiment, the technical feature "a serving cell to which the first signaling belongs and a time-domain occasion occupied by the first signaling in a serving cell to which it belongs are used to determine a position of the target HARQ-ACK bit in the first HARQ bit block" comprises the following meaning: an index of the target HARQ-ACK bit in the first HARQ bit block is related to an index of a serving cell corresponding to the first occasion set in the present application as well as an index of the first time-domain occasion in the present application in the first occasion set.

In one embodiment, the technical feature "a serving cell to which the first signaling belongs and a time-domain occasion occupied by the first signaling in a serving cell to which it belongs are used to determine a position of the target HARQ-ACK bit in the first HARQ bit block" comprises the following meaning: a serving cell to which the first signaling belongs and a time-domain occasion occupied by the first signaling in a serving cell to which it belongs are used to determine a position of the target HARQ-ACK bit in the first HARQ bit block according to Type-1 HARQ-ACK codebook.

In one embodiment, the technical feature "a serving cell to which the first signaling belongs and a time-domain occasion occupied by the first signaling in a serving cell to which it belongs are used to determine a position of the target HARQ-ACK bit in the first HARQ bit block" comprises the following meaning: a serving cell to which the first signaling belongs and a time-domain occasion occupied by the first signaling in a serving cell to which it belongs are used to determine a position of the target HARQ-ACK bit in the first HARQ bit block according to a generation of pseudo codes of a HARQ-ACK codebook.

In one embodiment, a time-domain resource assignment table belonging to the reference serving cell is a TDRA table configured for the reference serving cell.

In one embodiment, a time-domain resource assignment table belonging to the reference serving cell is a list configured for an IE "PDSCH-TimeDomainResourceAllocationList" for an active BWP in the reference serving cell.

In one embodiment, a time-domain resource assignment table belonging to the reference serving cell is a TDRA list configured for the reference serving cell.

In one embodiment, a time-domain resource assignment table belonging to the reference serving cell is a time-domain resource assignment table associated with an active DL BWP in the reference serving cell.

In one embodiment, a time-domain resource assignment table belonging to the reference serving cell is a time-domain resource assignment table used for a PDSCH associated with an active DL BWP in the reference serving cell.

In one embodiment, a row index in a time-domain resource assignment table belonging to the reference serving cell is one of row indexes from 1.

In one embodiment, a row index in a time-domain resource assignment table belonging to the reference serving cell is one of row indexes from 0.

In one embodiment, any row index in a time-domain resource assignment table belonging to the reference serving cell is a positive integer.

In one embodiment, a time-domain resource assignment table belonging to the reference serving cell is a table associated with an active downlink (DL) BWP in the reference serving cell used for defining a slot offset, a start and length indicator value (SLIV), and a mapping type of a PDSCH reception.

In one embodiment, a time-domain resource assignment table belonging to the reference serving cell is a table to which a value that can be indicated by a TDRA field comprised in a scheduled DCI format in an active DL BWP in the reference serving cell belongs.

In one embodiment, the technical feature "a row index in a time-domain resource assignment table belonging to the reference serving cell is used to determine a time-domain occasion occupied by the first signaling in a serving cell to which it belongs" comprises the following meaning: a row index in a time-domain resource assignment table belonging to the reference serving cell is used by the first node in the present application to determine a time-domain occasion occupied by the first signaling in a serving cell to which it belongs.

In one embodiment, the technical feature "a row index in a time-domain resource assignment table belonging to the reference serving cell is used to determine a time-domain occasion occupied by the first signaling in a serving cell to which it belongs" comprises the following meaning: a configured row index in a time-domain resource assignment table belonging to the reference serving cell is used to determine a time-domain occasion occupied by the first signaling in a serving cell to which it belongs.

In one embodiment, the technical feature "a row index in a time-domain resource assignment table belonging to the reference serving cell is used to determine a time-domain occasion occupied by the first signaling in a serving cell to which it belongs" comprises the following meaning: a pre-defined row index in a time-domain resource assignment table belonging to the reference serving cell is used to determine a time-domain occasion occupied by the first signaling in a serving cell to which it belongs.

In one embodiment, the technical feature "a row index in a time-domain resource assignment table belonging to the reference serving cell is used to determine a time-domain occasion occupied by the first signaling in a serving cell to which it belongs" comprises the following meaning: a row index configured by a PDCCH other than the first signaling in a time-domain resource assignment table belonging to the reference serving cell is used to determine a time-domain occasion occupied by the first signaling in a serving cell to which it belongs.

In one embodiment, the technical feature that "a row index in a time-domain resource assignment table belonging to the reference serving cell is used to determine a time-domain occasion occupied by the first signaling in a serving cell to which it belongs" comprises the following meaning: a row index configured by a DCI format activated by an SPS PDSCH belonging to the reference serving cell in a time-domain resource assignment table belonging to the reference serving cell is used to determine a time-domain occasion occupied by the first signaling in a serving cell to which it belongs.

In one embodiment, the technical feature "a row index in a time-domain resource assignment table belonging to the reference serving cell is used to determine a time-domain occasion occupied by the first signaling in a serving cell to which it belongs" comprises the following meaning: a row index configured by a PDCCH belonging to a same SPS configuration with the first signaling other than the first signaling in a time-domain resource assignment table belonging to the reference serving cell is used to determine a time-domain occasion occupied by the first signaling in a serving cell to which it belongs.

In one embodiment, the technical feature "a row index in a time-domain resource assignment table belonging to the reference serving cell is used to determine a time-domain occasion occupied by the first signaling in a serving cell to which it belongs" comprises the following meaning: the reference serving cell comprises multiple time-domain occasions, a time-domain occasion occupied by the first signaling in a serving cell to which it belongs is one of the multiple time-domain occasions, the multiple time-domain occasions respectively correspond to multiple row indexes in a time-domain resource assignment table belonging to the reference serving cell, a time-domain occasion occupied by the first signaling in a serving cell to which it belongs is a time-domain occasion corresponding to a row index in a time-domain resource assignment table belonging to the reference serving cell among the multiple time-domain occasions.

In one embodiment, the technical feature "a row index in a time-domain resource assignment table belonging to the reference serving cell is used to determine a time-domain occasion occupied by the first signaling in a serving cell to which it belongs" comprises the following meaning: a row index in a time-domain resource assignment table belonging to the reference serving cell is used to determine a time-domain occasion occupied by the first signaling in a serving cell to which it belongs according to a determination method of time-domain occasion in Type-1 HARQ-ACK codebook.

In one embodiment, the technical feature "a row index in a time-domain resource assignment table belonging to the reference serving cell is used to determine a time-domain occasion occupied by the first signaling in a serving cell to which it belongs" comprises the following meaning: a row index in a time-domain resource assignment table belonging to the reference serving cell is used to determine a position or index of a time-domain occasion occupied by the first signaling in a serving cell to which it belongs in a time-domain occasion set to which it belongs.

In one embodiment, the technical feature "a row index in a time-domain resource assignment table belonging to the reference serving cell is used to determine a time-domain occasion occupied by the first signaling in a serving cell to which it belongs" comprises the following meaning: a row index in a time-domain resource assignment table belonging to the reference serving cell is used to determine a position or index of a time-domain occasion occupied by the first signaling in a serving cell to which it belongs in the first occasion set in the present application.

In one embodiment, the technical feature "a row index in a time-domain resource assignment table belonging to the reference serving cell is used to determine a time-domain occasion occupied by the first signaling in a serving cell to which it belongs" comprises the following meaning: a row index in a time-domain resource assignment table belonging to the reference serving cell is used to determine that a time-domain occasion set generating Type-1 HARQ-ACK codebook comprises a time-domain occasion occupied by the first signaling in a serving cell to which it belongs.

In one embodiment, the technical feature "a row index in a time-domain resource assignment table belonging to the reference serving cell is used to determine a time-domain occasion occupied by the first signaling in a serving cell to which it belongs" comprises the following meaning: a row index in a time-domain resource assignment table belonging to the reference serving cell is used to determine that a time-domain occasion occupied by the first signaling in a serving cell to which it belongs is added into a time-domain occasion set generating Type-1 HARQ-ACK codebook.

In one embodiment, the technical feature "a row index in a time-domain resource assignment table belonging to the reference serving cell is used to determine a time-domain occasion occupied by the first signaling in a serving cell to which it belongs" comprises the following meaning: a row index in a time-domain resource assignment table belonging to the reference serving cell is used to determine that a time-domain occasion occupied by the first signaling in a serving cell to which it belongs is added into the first occasion set in the present application.

Embodiment 11

Embodiment 11 illustrates a schematic diagram of M1 occasion sets according to one embodiment of the present application, as shown in FIG. 11. In FIG. 11, the horizontal axis represents time, each rectangle represents a time-domain occasion, the horizontal dashed line divides time-domain occasions into M1 occasion sets, and the slash-filled rectangle represents a first time-domain occasion.

In embodiment 11, time-domain resources occupied by the first signaling in the present application belong to a first time-domain occasion, the first time-domain occasion is a time-domain occasion comprised in a first occasion set, the first occasion set is one of M1 occasion sets, and any of the M1 occasion sets comprise at least one time-domain occasion, M1 being a positive integer greater than 1; the M1 occasion sets respectively correspond to M1 serving cells, a serving cell to which the first signaling belongs is one of the M1 serving cells, the first occasion set is an occasion set corresponding to a serving cell to which the first signaling belongs; the M1 serving cells are indexed in order, and time-domain occasions comprised in the first occasion set are indexed in order; HARQ-ACK bits comprised in the first HARQ bit block in the present application are indexed in order, any time-domain occasion comprised in any of the M1 occasion sets corresponds to at least one HARQ-ACK bit in the first HARQ bit block, the target HARQ-ACK bit in the present application is a HARQ-ACK bit corresponding to the first time-domain occasion in the first HARQ bit block, and an index of the target HARQ-ACK bit in the first HARQ bit block is related to both an index of a serving cell corresponding to the first occasion set and an index of the first time-domain occasion in the first occasion set.

In one embodiment, the first time-domain occasion only comprises time-domain resources occupied by the first signaling.

In one embodiment, the first time-domain occasion also comprises time-domain resources other than time-domain resources occupied by the first signaling.

In one embodiment, the first occasion set only comprises the first time-domain occasion.

In one embodiment, the first occasion set also comprises a time-domain occasion other than the first time-domain occasion.

In one embodiment, any time-domain occasion comprised in any of the M occasion sets comprises at least one time-domain symbol.

In one embodiment, when a time-domain occasion comprised in one of the M1 occasion sets comprises multiple time-domain symbols, the multiple time-domain symbols are continuous in time domain.

In one embodiment, each time-domain symbol(s) comprised in any two time-domain occasions comprised in any of the M1 occasion sets corresponds to an equal SCS.

In one embodiment, there exist two of the M1 occasion sets respectively comprising two time-domain occasions corresponding to unequal SCSs.

In one embodiment, both two time-domain occasions respectively comprised in any two of the M1 occasion sets correspond to equal SCSs.

In one embodiment, any time-domain occasion comprised in any of the M1 occasion sets is a candidate PDSCH reception occasion.

In one embodiment, any time-domain occasion comprised in any of the M1 occasion sets is a candidate PDSCH reception candidate occasion or an SPS PDSCH release occasion or a TCI state update occasion.

In one embodiment, the M1 serving cells are configurable.

In one embodiment, any serving cell comprised in the first cell is one of the M1 serving cells.

In one embodiment, there exists one of the M1 serving cells being a serving cell other than the first cell set.

In one embodiment, the M1 serving cells consists(consist) of the first cell set.

In one embodiment, the technical feature that "the M1 occasion sets respectively correspond to M1 serving cells" comprises the following meaning: any of the M1 occasion sets is per serving cell.

In one embodiment, the technical feature that "the M1 occasion sets respectively correspond to M1 serving cells" comprises the following meaning: the M1 occasion sets respectively belong to the M1 serving cells.

In one embodiment, the technical feature that "the M1 occasion sets respectively correspond to M1 serving cells" comprises the following meaning: the M1 occasion sets are respectively associated with the M1 serving cells.

In one embodiment, the technical feature that "the M1 occasion sets respectively correspond to M1 serving cells" comprises the following meaning: a candidate PDSCH reception or an SPS PDSCH release or a TCI status update respectively corresponding to the M1 occasion sets respectively belong to the M1 serving cells.

In one embodiment, the technical feature that "the M1 occasion sets respectively correspond to M1 serving cells" comprises the following meaning: a time-domain occasion comprised in an occasion set corresponding to any of the M1 serving cells can only be used for a reception on the serving cell.

In one embodiment, the M1 serving cells are indexed in order starting from 0.

In one embodiment, the M1 serving cells are indexed in order starting from 0 to M1−1.

In one embodiment, the M1 serving cells are indexed in order in ascending order according to serving cell index.

In one embodiment, the M1 serving cells are indexed in order in a descending order according to serving cell index.

In one embodiment, the M1 serving cells are indexed in order by integers from 0 to M1−1 in an ascending order according to RRC configured index.

In one embodiment, time-domain occasions comprised in the first occasion set are indexed in order from 0.

In one embodiment, the first occasion set comprises M2 time-domain occasions, and time-domain occasions comprised in the first occasion set are indexed in order by integers from 0 to M2−1.

In one embodiment, time-domain occasions comprised in the first opportunity set are indexed in order according to an index of an occupied latest time-domain symbol.

In one embodiment, time-domain occasions comprised in the first opportunity set are sequentially indexed in an ascending order of an index of an occupied latest time-domain symbol.

In one embodiment, time-domain occasions comprised in the first opportunity set are indexed sequentially in a descending order of an index of an occupied latest time-domain symbol.

In one embodiment, the first occasion set comprises M2 time-domain occasions, and time-domain occasions comprised in the first occasion set are indexed sequentially by integers from 0 to M2−1 in an ascending order of an occupied latest time-domain symbol.

In one embodiment, HARQ-ACK bits comprised in the first HARQ bit block are indexed by integers in order from 0.

In one embodiment, the first HARQ bit block comprises M3 information bits, and HARQ-ACK bits comprised in the first HARQ bit are indexed from 0 to M3−1 in order.

In one embodiment, any time-domain occasion comprised in any of the M1 occasion sets corresponds to only one HARQ-ACK bit in the first HARQ bit block.

In one embodiment, there exists a time-domain occasion comprised in one of the M1 occasion sets corresponding to multiple HARQ-ACK bits in the first HARQ bit block.

In one embodiment, a HARQ-ACK for any time-domain occasion comprised in any of the M1 occasion sets is transmitted through at least one HARQ-ACK bit corresponding to the first HARQ bit block.

In one embodiment, a transport block occupying any time-domain occasion comprised in any of the M1 occasion sets or a HARQ-ACK of a PDCCH is transmitted through at least one HARQ-ACK bit corresponding to the first HARQ bit block.

In one embodiment, whether a transport block occupying any time-domain occasion comprised in any of the M1 occasion sets is correctly decoded or whether a PDCCH is detected is used to generate a bit value of at least one HARQ-ACK bit corresponding to the first HARQ bit block.

In one embodiment, the technical feature that "an index of the target HARQ-ACK bit in the first HARQ bit block is related to both an index of a serving cell corresponding to the first occasion set as well as an index of the first time-domain occasion in the first occasion set" comprises the following meaning: an index of a serving cell corresponding to the first occasion set as well as an index of the first time-domain occasion in the first occasion are used to determine an index of the target HARQ-ACK bit in the first HARQ bit block.

In one embodiment, the technical feature that "an index of the target HARQ-ACK bit in the first HARQ bit block is related to both an index of a serving cell corresponding to the first occasion set as well as an index of the first time-domain occasion in the first occasion set" comprises the following meaning: an index of the target HARQ-ACK bit in the first HARQ bit block is linearly correlated with the index of a serving cell corresponding to the first occasion set, and an index of the target HARQ-ACK bit in the first HARQ bit block is linearly correlated with an index of the first time-domain occasion in the first occasion set.

In one embodiment, the technical feature that "an index of the target HARQ-ACK bit in the first HARQ bit block is related to both an index of a serving cell corresponding to the first occasion set as well as an index of the first time-domain occasion in the first occasion set" comprises the following meaning: an index of the target HARQ-ACK bit in the first HARQ bit block is positively correlated with an index of w serving cell corresponding to the first occasion set, and an index of the target HARQ-ACK bit in the first HARQ bit block is positively correlated with an index of the first time-domain occasion in the first occasion set.

In one embodiment, the technical feature that "an index of the target HARQ-ACK bit in the first HARQ bit block is related to both an index of a serving cell corresponding to the first occasion set as well as an index of the first time-domain occasion in the first occasion set" comprises the following meaning: an index of a serving cell corresponding to the first occasion set as well as an index of the first time-domain occasion in the first occasion are used to determine an index of the target HARQ-ACK bit in the first HARQ bit block according to Type-1 HARQ-ACK codebook.

In one embodiment, the technical feature that "an index of the target HARQ-ACK bit in the first HARQ bit block is related to both an index of a serving cell corresponding to the first occasion set as well as an index of the first time-domain occasion in the first occasion set" comprises the following meaning: an index of a serving cell corresponding to the first occasion set as well as an index of the first time-domain occasion in the first occasion are used to determine an index of the target HARQ-ACK bit in the first HARQ bit block according to generation of pseudo codes for HARQ-ACK codebook.

In one embodiment, the technical feature that "an index of the target HARQ-ACK bit in the first HARQ bit block is related to both an index of a serving cell corresponding to the first occasion set as well as an index of the first time-domain occasion in the first occasion set" comprises the following meaning: an index of a serving cell corresponding to the first occasion set in multiple serving cells configured at RRC and an index of the first time-domain occasion in the first occasion set are used to determine an index of the target HARQ-ACK bit in the first HARQ bit block according to Type-1 HARQ-ACK codebook.

Embodiment 12

Embodiment 12 illustrates the structure diagram of a processor in a first node, as shown in FIG. 12. In FIG. 12, a processor 1200 in the first node is comprised of a first receiver 1201 and a first transmitter 1202. The first receiver 1201 comprises the transmitter/receiver 456 (including the antenna 460), the receiving processor 452 and the controller/processor 490 in FIG. 4 of the present application; the first transmitter 1202 comprises the transmitter/receiver 456 (including the antenna 460), the transmitting processor 455 and the controller/processor 490 in FIG. 4 of the present application.

In embodiment 12, the first receiver 1201 receives a first information block and receives a first signaling, the first signaling corresponds to a first cell set, and the first cell set comprises multiple serving cells, the first information block is used to determine the first cell set; the first transmitter 1202 transmits a first signal in a target slot, the first signal carries a first HARQ bit block, the first HARQ bit block comprises multiple HARQ-ACK bits, the first HARQ bit block comprises a target HARQ-ACK bit, a detection on the first signaling is used to determine a bit value of the target HARQ-ACK bit; time-domain resources occupied by the first signaling are used to determine a reference slot; the first signaling is used to determine a number of slot(s) between the reference slot and the target slot, and a time length of the reference slot is related to an SCS of a subcarrier occupied by the first signal; a reference serving cell is a serving cell related to the first cell set, and a position of the target HARQ-ACK bit in the first HARQ bit block is related to the reference serving cell.

In one embodiment, the reference serving cell is a predefined serving cell comprised in the first cell set, and the first signaling carries a DCI format, a DCI format carried by the first signaling comprises information other than PDSCH scheduling information; a position of the target HARQ-ACK bit in the first HARQ bit block is the same as a position of a HARQ-ACK bit of a PDSCH belonging to the reference serving cell and corresponding to the first signaling in the first HARQ bit block.

In one embodiment, a first delay value is equal to a number of slot(s) between the reference slot and the target slot, and the first delay value is an integer; the first delay value is a delay value comprised in a target delay set, the target delay set comprises at least one delay value, and any delay value comprised in the target delay set is an integer; a DCI format carried by the first signaling is used to determine the target delay set.

In one embodiment, the first signal is later than the first signaling in time domain, and a number of time-domain symbol(s) between the first signal and the first signaling in time domain is not less than a first threshold, and the first threshold is greater than 0; a first index value is equal to an index value of an SCS of a subcarrier occupied by the first signaling in frequency domain, a second index value is equal to an index value of an SCS of a subcarrier occupied by the first signal in frequency domain, and a smaller one of the first index value and the second index value is used to determine the first threshold.

In one embodiment, the first signaling carries a first DCI format, and a first field is a field comprised in the first DCI format, and the first field comprised in the first signaling is set to a predefined value; a size of the first DCI format is related to a number of serving cells comprised in the first cell set; a position of the first field in the first DCI format is used to determine a first serving cell from the first cell set, and the first DCI format is used for the first serving cell.

In one embodiment, a serving cell to which the first signaling belongs and a time-domain occasion occupied by the first signaling in a serving cell to which it belongs are used to determine a position of the target HARQ-ACK bit in the first HARQ bit block, and a row index in a time-domain resource assignment table belonging to the reference serving cell is used to determine a time-domain occasion occupied by the first signaling in a serving cell to which it belongs.

In one embodiment, time-domain resources occupied by the first signaling belong to a first time-domain occasion, the first time-domain occasion is a time-domain occasion comprised in a first occasion set, the first occasion set is one of M1 occasion sets, and any of the M1 occasion sets comprise at least one time-domain occasion, M1 being a positive integer greater than 1; the M1 occasion sets respectively correspond to M1 serving cells, a serving cell to which the first signaling belongs is one of the M1 serving cells, the first occasion set is an occasion set corresponding to a serving cell to which the first signaling belongs; the M1 serving cells are indexed in order, and time-domain occasions comprised in the first occasion set are indexed in order; HARQ-ACK bits comprised in the first HARQ bit block are indexed in order, any time-domain occasion comprised in any of the M1 occasion sets corresponds to at least one HARQ-ACK bit in the first HARQ bit block, the target HARQ-ACK bit is a HARQ-ACK bit corresponding to the first time-domain occasion in the first HARQ bit block, and an index of the target HARQ-ACK bit in the first HARQ bit block is related to both an index of a serving cell corresponding to the first occasion set and an index of the first time-domain occasion in the first occasion set.

Embodiment 13

Embodiment 13 illustrates the structure diagram of a processor in a second node, as shown in FIG. 13. In FIG. 13, a processor 1300 in the second node is comprised of a second transmitter 1301 and a second receiver 1302. The second transmitter 1301 comprises the transmitter/receiver 416 (including the antenna 460), the transmitting processor 415 and the controller/processor 440 in FIG. 4 of the present application; the second receiver 1302 comprises the transmitter/receiver 416 (including the antenna 460), the receiving processor 412 and the controller/processor 440 in FIG. 4 of the present application.

In embodiment 13, the second transmitter 1301 transmits a first information block and transmits a first signaling, the first signaling corresponds to a first cell set, and the first cell set comprises multiple serving cells, the first information block is used to determine the first cell set; the second receiver 1302 receives a first signal in a target slot, the first signal carries a first HARQ bit block, the first HARQ bit block comprises multiple HARQ-ACK bits, the first HARQ bit block comprises a target HARQ-ACK bit, and a detection on the first signaling is used to determine a bit value of the target HARQ-ACK bit; herein, time-domain resources occupied by the first signaling are used to determine a reference slot; the first signaling is used to determine a number of slot(s) between the reference slot and the target slot, and a time length of the reference slot is related to an SCS of a subcarrier occupied by the first signal; a reference serving cell is a serving cell related to the first cell set, and a position of the target HARQ-ACK bit in the first HARQ bit block is related to the reference serving cell.

In one embodiment, the reference serving cell is a predefined serving cell comprised in the first cell set, and the first signaling carries a DCI format, a DCI format carried by the first signaling comprises information other than PDSCH scheduling information; a position of the target HARQ-ACK bit in the first HARQ bit block is the same as a position of a HARQ-ACK bit of a PDSCH belonging to the reference serving cell and corresponding to the first signaling in the first HARQ bit block.

In one embodiment, a first delay value is equal to a number of slot(s) between the reference slot and the target slot, and the first delay value is an integer; the first delay value is a delay value comprised in a target delay set, the target delay set comprises at least one delay value, and any delay value comprised in the target delay set is an integer; a DCI format carried by the first signaling is used to determine the target delay set.

In one embodiment, the first signal is later than the first signaling in time domain, and a number of time-domain symbol(s) between the first signal and the first signaling in time domain is not less than a first threshold, and the first threshold is greater than 0; a first index value is equal to an index value of an SCS of a subcarrier occupied by the first signaling in frequency domain, a second index value is equal to an index value of an SCS of a subcarrier occupied by the first signal in frequency domain, and a smaller one of the first index value and the second index value is used to determine the first threshold.

In one embodiment, the first signaling carries a first DCI format, and a first field is a field comprised in the first DCI format, and the first field comprised in the first signaling is set to a predefined value; a size of the first DCI format is related to a number of serving cells comprised in the first cell set; a position of the first field in the first DCI format is used to determine a first serving cell from the first cell set, and the first DCI format is used for the first serving cell.

In one embodiment, a serving cell to which the first signaling belongs and a time-domain occasion occupied by the first signaling in a serving cell to which it belongs are used to determine a position of the target HARQ-ACK bit in the first HARQ bit block, and a row index in a time-domain resource assignment table belonging to the reference serving cell is used to determine a time-domain occasion occupied by the first signaling in a serving cell to which it belongs.

In one embodiment, time-domain resources occupied by the first signaling belong to a first time-domain occasion, the first time-domain occasion is a time-domain occasion comprised in a first occasion set, the first occasion set is one of M1 occasion sets, and any of the M1 occasion sets comprise at least one time-domain occasion, M1 being a positive integer greater than 1; the M1 occasion sets respectively correspond to M1 serving cells, a serving cell to which the first signaling belongs is one of the M1 serving cells, the first occasion set is an occasion set corresponding to a serving cell to which the first signaling belongs; the M1 serving cells are indexed in order, and time-domain occasions comprised in the first occasion set are indexed in order; HARQ-ACK bits comprised in the first HARQ bit block are indexed in order, any time-domain occasion comprised in any of the M1 occasion sets corresponds to at least one HARQ-ACK bit in the first HARQ bit block, the target HARQ-ACK bit is a HARQ-ACK bit corresponding to the first time-domain occasion in the first HARQ bit block, and an index of the target HARQ-ACK bit in the first HARQ bit block is related to both an index of a serving cell corresponding to the first occasion set and an index of the first time-domain occasion in the first occasion set.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node or the second node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, tele-controlled aircrafts and other wireless communication devices. The base station or network side equipment in the present application includes but is not limited to macro-cellular base stations, micro-cellular base stations, home base stations, relay base station, eNB, gNB, Transmitter Receiver Point (TRP), relay satellites, satellite base stations, space base stations and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) configured for wireless communications, the UE comprising:

a receiver configured to receive a first information block, the first information block being used to determine a first cell set, wherein the first cell set comprises multiple serving cells, wherein a reference serving cell is a serving cell related to the first cell set;

the receiver is configured to receive a first signaling, the first signaling corresponding to the first cell set; and a transmitter configured to transmit a first signal in a target slot, the first signal including a first hybrid automatic repeat request (HARQ) bit block, the first HARQ bit block comprising multiple HARQ-acknowledgement (HARQ-ACK) bits, the first HARQ bit block comprising a target HARQ-ACK bit, a detection on the first signaling being used to determine a bit value of the target HARQ-ACK bit, wherein a position of the target HARQ-ACK bit in the first HARQ bit block is related to the reference serving cell, wherein time-domain resources occupied by the first signaling are used to determine a reference slot, the first signaling is used to determine a number of slots between the reference slot and the target slot, and a time length of the reference slot is related to a Subcarrier Spacing (SCS) of a subcarrier occupied by the first signal.

2. The UE of claim 1, wherein the reference serving cell is a predefined serving cell comprised in the first cell set, and the first signaling includes a downlink control information (DCI) format, a DCI format included in the first signaling comprises information other than physical downlink shared channel (PDSCH) scheduling information, wherein a position of the target HARQ-ACK bit in the first HARQ bit block is the same as a position of a HARQ-ACK bit of a PDSCH belonging to the reference serving cell and corresponding to the first signaling in the first HARQ bit block.

3. The UE of claim 1, wherein a first delay value is equal to a number of slots between the reference slot and the target slot, wherein the first delay value is a delay value comprised in a target delay set, the target delay set comprises at least one delay value, wherein a DCI format included in the first signaling is used to determine the target delay set.

4. The UE of claim 1, wherein the first signal is later than the first signaling in time domain, and a number of time-domain symbols between the first signal and the first signaling in time domain is not less than a first threshold, wherein the first threshold is greater than 0, wherein a first index value is equal to an index value of an SCS of a subcarrier occupied by the first signaling in frequency domain, a second index value is equal to an index value of an SCS of a subcarrier occupied by the first signal in frequency domain, and a smaller one of the first index value and the second index value is used to determine the first threshold.

5. The UE of claim 1, wherein the first signaling comprises a first DCI format, and a first field is a field comprised in the first DCI format, and the first field comprised in the first signaling is set to a predefined value, wherein a size of the first DCI format is related to a number of serving cells comprised in the first cell set, wherein a position of the first field in the first DCI format is used to determine a first serving cell from the first cell set, and the first DCI format is used for the first serving cell.

6. The UE of claim 1, wherein a serving cell to which the first signaling belongs and a time-domain occasion occupied by the first signaling in a serving cell to which it belongs are used to determine a position of the target HARQ-ACK bit in the first HARQ bit block, wherein a row index in a time-domain resource assignment table belonging to the reference serving cell is used to determine a time-domain occasion occupied by the first signaling in a serving cell to which it belongs.

7. The UE of claim 1, wherein time-domain resources occupied by the first signaling belong to a first time-domain occasion, the first time-domain occasion is a time-domain occasion comprised in a first occasion set, the first occasion set is one of M1 occasion sets, and any of the M1 occasion sets comprise at least one time-domain occasion; the M1 occasion sets respectively correspond to M1 serving cells, a serving cell to which the first signaling belongs is one of the M1 serving cells, the first occasion set is an occasion set corresponding to a serving cell to which the first signaling belongs; the M1 serving cells are indexed in order, and time-domain occasions comprised in the first occasion set are indexed in order; HARQ-ACK bits comprised in the first HARQ bit block are indexed in order, any time-domain occasion comprised in any of the M1 occasion sets corresponds to at least one HARQ-ACK bit in the first HARQ bit block, the target HARQ-ACK bit is a HARQ-ACK bit corresponding to the first time-domain occasion in the first HARQ bit block, and an index of the target HARQ-ACK bit in the first HARQ bit block is related to both an index of a serving cell corresponding to the first occasion set and an index of the first time-domain occasion in the first occasion set.

8. A base station configured for wireless communications, the base station comprising:

a transmitter configured to transmit a first information block, the first information block being used to determine a first cell set, wherein the first cell set comprises multiple serving cells, wherein a reference serving cell is a serving cell related to the first cell set;

the transmitter is configured to transmit a first signaling, the first signaling corresponding to the first cell set; and a receiver configured to receive a first signal in a target slot, the first signal including a first hybrid automatic repeat request (HARQ) bit block, the first HARQ bit block comprising multiple HARQ-acknowledgement (HARQ-ACK) bits, the first HARQ bit block comprising a target HARQ-ACK bit, a detection on the first signaling being used to determine a bit value of the target HARQ-ACK bit, wherein a position of the target HARQ-ACK bit in the first HARQ bit block is related to the reference serving cell, wherein time-domain resources occupied by the first signaling are used to determine a reference slot, the first signaling is used to determine a number of slots between the reference slot and the target slot, and a time length of the reference slot is related to an SCS of a subcarrier occupied by the first signal.

9. The base station of claim 8, wherein the reference serving cell is a predefined serving cell comprised in the first cell set, and the first signaling includes a downlink control information (DCI) format, a DCI format included in the first signaling comprises information other than physical downlink shared channel (PDSCH) scheduling information, wherein a position of the target HARQ-ACK bit in the first HARQ bit block is the same as a position of a HARQ-ACK bit of a PDSCH belonging to the reference serving cell and corresponding to the first signaling in the first HARQ bit block.

10. The base station of claim 8, wherein a first delay value is equal to a number of slots between the reference slot and the target slot, wherein the first delay value is a delay value comprised in a target delay set, the target delay set comprises at least one delay value, wherein a DCI format included in the first signaling is used to determine the target delay set.

11. The base station of claim 8, wherein the first signal is later than the first signaling in time domain, and a number of time-domain symbols between the first signal and the first signaling in time domain is not less than a first threshold, wherein the first threshold is greater than 0, wherein a first index value is equal to an index value of an SCS of a subcarrier occupied by the first signaling in frequency domain, a second index value is equal to an index value of an SCS of a subcarrier occupied by the first signal in frequency domain, and a smaller one of the first index value and the second index value is used to determine the first threshold.

12. The base station of claim 8, wherein the first signaling comprises a first DCI format, and a first field is a field comprised in the first DCI format, and the first field comprised in the first signaling is set to a predefined value, wherein a size of the first DCI format is related to a number of serving cells comprised in the first cell set, wherein a position of the first field in the first DCI format is used to determine a first serving cell from the first cell set, and the first DCI format is used for the first serving cell.

13. The base station of claim 8, wherein a serving cell to which the first signaling belongs and a time-domain occasion occupied by the first signaling in a serving cell to which it belongs are used to determine a position of the target HARQ-ACK bit in the first HARQ bit block, wherein a row index in a time-domain resource assignment table belonging to the reference serving cell is used to determine a time-domain occasion occupied by the first signaling in a serving cell to which it belongs.

14. A method for use in a user equipment (UE) configured for wireless communications, the method comprising:

receiving a first information block, the first information block being used to determine a first cell set, wherein the first cell set comprises multiple serving cells, wherein a reference serving cell is a serving cell related to the first cell set;

receiving a first signaling, the first signaling corresponding to the first cell set; and transmitting a first signal in a target slot, the first signal including a first hybrid automatic repeat request (HARQ) bit block, the first HARQ bit block comprising multiple HARQ-acknowledgement (HARQ-ACK) bits, the first HARQ bit block comprising a target HARQ-ACK bit, a detection on the first signaling being used to determine a bit value of the target HARQ-ACK bit, wherein a position of the target HARQ-ACK bit in the first HARQ bit block is related to the reference serving cell, wherein time-domain resources occupied by the first signaling are used to determine a reference slot, the first signaling is used to determine a number of slots between the reference slot and the target slot, and a time length of the reference slot is related to an SCS of a subcarrier occupied by the first signal.

15. The method of claim 14, wherein the reference serving cell is a predefined serving cell comprised in the first cell set, and the first signaling includes a downlink control information (DCI) format, a DCI format included in the first signaling comprises information other than physical downlink shared channel (PDSCH) scheduling information, wherein a position of the target HARQ-ACK bit in the first HARQ bit block is the same as a position of a HARQ-ACK bit of a PDSCH belonging to the reference serving cell and corresponding to the first signaling in the first HARQ bit block.

16. The method of claim 14, wherein a first delay value is equal to a number of slots between the reference slot and the target slot, wherein the first delay value is a delay value comprised in a target delay set, the target delay set comprises at least one delay value, a DCI format included in the first signaling is used to determine the target delay set.

17. The method of claim 14, wherein the first signal is later than the first signaling in time domain, a number of time-domain symbols between the first signal and the first signaling in time domain is not less than a first threshold, wherein the first threshold is greater than 0, wherein a first index value is equal to an index value of an SCS of a subcarrier occupied by the first signaling in frequency domain, a second index value is equal to an index value of an SCS of a subcarrier occupied by the first signal in frequency domain, and a smaller one of the first index value and the second index value is used to determine the first threshold.

18. The method of claim 14, wherein the first signaling comprises a first DCI format, and a first field is a field comprised in the first DCI format, and the first field comprised in the first signaling is set to a predefined value, wherein a size of the first DCI format is related to a number of serving cells comprised in the first cell set, wherein a position of the first field in the first DCI format is used to determine a first serving cell from the first cell set, and the first DCI format is used for the first serving cell.

19. The method of claim 14, wherein a serving cell to which the first signaling belongs and a time-domain occasion occupied by the first signaling in a serving cell to which it belongs are used to determine a position of the target HARQ-ACK bit in the first HARQ bit block, wherein a row index in a time-domain resource assignment table belonging to the reference serving cell is used to determine a time-domain occasion occupied by the first signaling in a serving cell to which it belongs.

20. The method of claim 14, wherein time-domain resources occupied by the first signaling belong to a first time-domain occasion, the first time-domain occasion is a time-domain occasion comprised in a first occasion set, the first occasion set is one of M1 occasion sets, and any of the M1 occasion sets comprise at least one time-domain occasion; the M1 occasion sets respectively correspond to M1 serving cells, a serving cell to which the first signaling belongs is one of the M1 serving cells, the first occasion set is an occasion set corresponding to a serving cell to which the first signaling belongs; the M1 serving cells are indexed in order, and time-domain occasions comprised in the first occasion set are indexed in order; HARQ-ACK bits comprised in the first HARQ bit block are indexed in order, any time-domain occasion comprised in any of the M1 occasion sets corresponds to at least one HARQ-ACK bit in the first HARQ bit block, the target HARQ-ACK bit is a HARQ-ACK bit corresponding to the first time-domain occasion in the first HARQ bit block, and an index of the target HARQ-ACK bit in the first HARQ bit block is related to both an index of a serving cell corresponding to the first occasion set and an index of the first time-domain occasion in the first occasion set.

* * * * *